United States Patent
Ji et al.

(10) Patent No.: US 12,190,564 B2
(45) Date of Patent: Jan. 7, 2025

(54) SYSTEMS AND METHODS FOR END-TO-END FEATURE COMPRESSION IN CODING OF MULTI-DIMENSIONAL DATA

(71) Applicant: SHARP KABUSHIKI KAISHA, Sakai (JP)

(72) Inventors: Tianying Ji, Camas, WA (US); Sachin G. Deshpande, Camas, WA (US)

(73) Assignee: Sharp Kabushiki Kaisha, Sakai (JP)

( * ) Notice: Subject to any disclaimer, the term of this patent is extended or adjusted under 35 U.S.C. 154(b) by 66 days.

(21) Appl. No.: 17/963,923

(22) Filed: Oct. 11, 2022

(65) Prior Publication Data

US 2024/0127583 A1  Apr. 18, 2024

(51) Int. Cl.
G06V 10/77 (2022.01)
H04N 19/91 (2014.01)

(52) U.S. Cl.
CPC ......... G06V 10/7715 (2022.01); H04N 19/91 (2014.11)

(58) Field of Classification Search
CPC .. H04N 19/124; H04N 19/159; H04N 19/184; H04N 19/33; H04N 19/503; H04N 19/59; H04N 19/85; H04N 19/90; H04N 19/172; H04N 19/176; G06N 3/045; G06N 3/08; G06V 10/82; G06V 10/764; G06V 10/454; G06V 10/806; G06V 30/18057; G06T 2207/20081; G06T 3/4046; G06T 7/11; G06T 2207/20016
USPC ............................................. 375/240–240.29
See application file for complete search history.

(56) References Cited

U.S. PATENT DOCUMENTS

| | | | | |
|---|---|---|---|---|
| 2019/0045168 | A1* | 2/2019 | Chaudhuri | G06T 3/4053 |
| 2019/0294413 | A1* | 9/2019 | Vantrease | G06F 7/5095 |
| 2020/0410337 | A1* | 12/2020 | Huang | G06N 3/04 |
| 2021/0019562 | A1* | 1/2021 | Yang | G06F 18/253 |
| 2022/0172051 | A1* | 6/2022 | Yi | G06V 10/7747 |

OTHER PUBLICATIONS

Dong-Ha Kim, et al. "[VCM Track 1] Compression of FPN Multi-Scale Features for Object Detection Using VVC", m59562, ISO/IEC JTC 1/SC 29/WG 2, Apr. 2022.
Dong-Ha Kim, et al. "[VCM-Track1] Performance of the Enhanced MSFC with Bottom-Up MSFF", m60197, Jul. 2022.
Hu et al., "Squeeze-and-Excitation Networks," arXiv:1709.01507, May 16, 2019.
Mentzer et al., "Conditional Probability Models for Deep Image Compression," arXiv:1801.042604v4, Jun. 4, 2019.

(Continued)

*Primary Examiner* — Nathnael Aynalem
(74) *Attorney, Agent, or Firm* — J. Fish Law, PLLC

(57) ABSTRACT

A device may be configured to compress feature data according to one or more of the techniques described herein. In one example, feature data may be compressed by using residual encoding to enhance the feature data by removing redundancies. Enhanced feature data may be spatially down sampled and the number of channels of the enhanced feature data may be reduced by applying a 2D convolution operation. A heatmap based on the reduced enhanced feature data may be generated. The reduced enhanced feature data may be scaled using the generated heatmap. The scaled reduced enhanced feature data may be entropy encoded to generate a bitstream.

5 Claims, 26 Drawing Sheets

(56) References Cited

OTHER PUBLICATIONS

Redmon et al., "YOLOv3: An Incremental Improvement," arXiv:1804.02767, Apr. 8, 2018.
Ren et al., "Faster R-CNN: Towards Real-Time Object Detection with Region Proposal Networks," arXiv:1506.01497v3, Jan. 6, 2016 for Faster RCNN.
JVET-T2001-v2 "Verastile Video Coding Editorial Refinements on Draft 10)" Joint Video Experts Team (JVET) of ITU-T SG 16 WP 3 and ISO/IEC JTC 1/SC 29, 20th Meeting, by teleconference, Oct. 7-16, 2020.
ITU-T H.265 "High efficiency video coding" (Dec. 2016).
ITU-T H.264 "Advanced video coding for generic audiovisual services" (Oct. 2016).
Misra Kiran et al: "Video Feature Compression for Machine Tasks", 2022 IEEE International Conference On Multimedia and Expo (ICME), IEEE, Jul. 18, 2022 (Jul. 18, 2022), pp. 1-6, XP034175714, DOI: 10.1109/ICME52920.2022.9859894.
Zhang Zhicong et al: "MSFC: Deep Feature Compression in Multi-Task Network", 2021 IEEE International Conference on Multimedia and Expo (ICME), IEEE, Jul. 5, 2021 (Jul. 5, 2021), pp. 1-6, XP034125237, DOI: 10.1109/ICME51207.2021.9428258.
Cai Chunlei et al: "End-to-End Optimized ROI Image Compression", IEEE Transactions on Image Processing, IEEE, USA, vol. 29, Dec. 25, 2019 (Dec. 25, 2019), pp. 3442-3457, XP011769267, ISSN: 1057-7149, DOI: 10.1109/TIP.2019.2960869.
Haisheng Fu et al: "Asymmetric Learned Image Compression with Multi-Scale Residual Block, Importance Map, and Post-Quantization Filtering", arxiv.org, Cornell University Library, 201, OLIN Library Cornell University Ithaca, NY, 14853, Jun. 21, 2022 (Jun. 21, 2022), XP091255420.
Tianying Ji (Sharplabs) et al: "[VCM] Track 1: End-to-End Feature Compression for Machine Task", 140. MPEG Meeting; Oct. 24, 2022-Oct. 28, 2022; Mainz; (Motion Picture Expert Group or ISO/IEC JTC1/SC29/WG11),No. m61148, Oct. 17, 2022 (Oct. 17, 2022), XP030305678.

* cited by examiner

SYSTEMS AND METHODS FOR END-TO-END FEATURE COMPRESSION IN CODING OF MULTI-DIMENSIONAL DATA

TECHNICAL FIELD

This disclosure relates to coding multi-dimensional data and more particularly to techniques for compression of feature data in an end-to-end network.

BACKGROUND

Digital video and audio capabilities can be incorporated into a wide range of devices, including digital televisions, computers, digital recording devices, digital media players, video gaming devices, smartphones, medical imaging devices, surveillance systems, tracking and monitoring systems, and the like. Digital video and audio can be represented as a set of arrays. Data represented as a set of arrays may be referred to as multi-dimensional data. For example, a picture in digital video can be represented as a set of two-dimensional arrays of sample values. That is, for example, a video resolution provides a width and height dimension of an array of sample values and each component of a color space provides a number of two-dimensional arrays in the set. Further, the number of pictures in a sequence of digital video provides another dimension of data. For example, one second of 60 Hz video at 1080p resolution having three color components could correspond to four dimensions of data values, i.e., the number of samples may be represented as follows: 1920×1080×3×60. Thus, digital video and images are examples of multi-dimensional data. It should be noted that digital video may be represented using additional and/or alternative dimensions (e.g., number of layers, number of views/channels, etc.).

Digital video may be coded according to a video coding standard. Video coding standards define the format of a compliant bitstream encapsulating coded video data. A compliant bitstream is a data structure that may be received and decoded by a video decoding device to generate reconstructed video data. Typically, the reconstructed video data is intended for human-consumption (i.e., viewing on a display). Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. The ITU-T Video Coding Experts Group (VCEG) and ISO/IEC (Moving Picture Experts Group (MPEG) (collectively referred to as the Joint Video Exploration Team (JVET)) have worked to standardize video coding technology with a compression capability that exceeds that of HEVC. This standardization effort is referred to as the Versatile Video Coding (VVC) project. "Versatile Video Coding (Draft 10)," 20th Meeting of ISO/IEC JTC1/SC29/VVG11 7-16 Oct. 2020, Teleconference, document JVET-T2001-v2, which is incorporated by reference herein, and referred to as VVC, represents the current iteration of the draft text of a video coding specification corresponding to the VVC project.

Video coding standards may utilize video compression techniques. Video compression techniques reduce data requirements for storing and/or transmitting video data by exploiting the inherent redundancies in a video sequence. Video compression techniques typically sub-divide a video sequence into successively smaller portions (i.e., groups of pictures within a video sequence, a picture within a group of pictures, regions within a picture, sub-regions within a region, etc.) and utilize intra prediction coding techniques (e.g., spatial prediction techniques within a picture) and inter prediction techniques (i.e., inter-picture techniques (temporal)) to generate difference values between a unit of video data to be coded and a reference unit of video data. The difference values may be referred to as residual data. Syntax elements may relate residual data and a reference coding unit (e.g., intra-prediction mode indices and motion information). Residual data and syntax elements may be entropy coded. Entropy encoded residual data and syntax elements may be included in data structures forming a compliant bitstream.

SUMMARY

In general, this disclosure describes various techniques for coding multi-dimensional data, which may be referred to as a multi-dimensional data set (MDDS) and may include, for example, video data, audio data, and the like. It should be noted that in addition to reducing the data requirements for providing multi-dimensional data for human consumption, the techniques for coding of multi-dimensional data described herein may be useful for other applications. For example, the techniques described herein may be useful for so-called machine consumption. That is, for example, in the case of surveillance, it may be useful for a monitoring application running on a central server to be able quickly identify and track an object from any of a number video feeds. In this case, it is not necessary that the coded video data is capable of being reconstructed to a human consumable form, but only capable of enabling an object to be identified. Object detection is an example of a so-called machine task. As described in further detail below, object detection, segmentation and/or tracking (i.e., object recognition tasks) typically involve receiving an image (e.g., a single image or an image included in a video sequence), generating feature data corresponding to the image, analyzing the feature data, and generating inference data, where inference data may indicate types of objects and spatial locations of objects within the image. Spatial locations of objects within an image may be specified by a bounding box having a spatial coordinate (e.g., x,y) and a size (e.g., a height and a width). This disclosure describes techniques for compressing feature data. In particular, this disclosure describes techniques for forming an end-to-end feature compression network. The techniques described in this disclosure may be particularly useful for allowing machine tasks to be distributed across a communication network. For example, in some applications, an acquisition device (e.g., a video camera and accompanying hardware) may have power and/or computational constraints. In this case, generation of feature data could be optimized for the capabilities at the acquisition device, but, the analysis and inference may be better suited to be performed at one or more devices with additional capabilities distributed across a network. In this case, compression of the feature set may facilitate efficient distribution (e.g., reduced bandwidth and/or latency) of object recognition tasks. It should be noted, as described in further detail below, inference data (e.g., spatial locations of objects within an image) may be used to optimize encoding of video data, (e.g., adjust coding parameters to improve relative image quality in regions where objects of interest are present and the like). Further, a video encoding device that utilizes inference data may be located at a distinct location from acquisition device. For example, a distribution network may include multiple distribution servers (at various physical locations) that perform compression and distribution of acquired video.

It should be noted that as used herein the term typical video coding standard or typical video coding may refer to a video coding standard utilizing one or more of the following video compression techniques: video partitioning techniques, intra prediction techniques, inter prediction techniques, residual transformation techniques, reconstructed video filtering techniques, and/or entropy coding techniques for residual data and syntax elements. For example, the term typical video coding standard may refer to any of ITU-T H.264, ITU-T H.265, VVC, and the like, individually or collectively. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of compressing feature data comprises receiving feature data, performing residual encoding on the received feature data to generate enhanced feature data, applying a two-dimensional convolution operation on the enhanced feature data to generate reduced feature data, wherein the reduced feature data is reduced about spatial and channel dimensions, generating a heatmap based on the reduced feature data, scaling the reduced feature data using the generated heatmap, and entropy encoding the scaled reduced feature data to generate a bitstream.

In one example, a device comprises one or more processors configured receive feature data, perform residual encoding on the received feature data to generate enhanced feature data, apply a two-dimensional convolution operation on the enhanced feature data to generate reduced feature data, wherein the reduced feature data is reduced about spatial and channel dimensions, generate a heatmap based on the reduced feature data, scale the reduced feature data using the generated heatmap, and entropy encode the scaled reduced feature data to generate a bitstream.

In one example, a non-transitory computer-readable storage medium comprises instructions stored thereon that, when executed, cause one or more processors of a device to perform residual encoding on the received feature data to generate enhanced feature data, apply a two-dimensional convolution operation on the enhanced feature data to generate reduced feature data, wherein the reduced feature data is reduced about spatial and channel dimensions, generate a heatmap based on the reduced feature data, scale the reduced feature data using the generated heatmap, and entropy encode the scaled reduced feature data to generate a bitstream.

In one example, an apparatus comprises means for receiving feature data, means for receiving feature data, means for performing residual encoding on the received feature data to generate enhanced feature data, means for applying a two-dimensional convolution operation on the enhanced feature data to generate reduced feature data, wherein the reduced feature data is reduced about spatial and channel dimensions, means for generating a heatmap based on the reduced feature data, means for scaling the reduced feature data using the generated heatmap, and means for entropy encoding the scaled reduced feature data to generate a bitstream.

The details of one or more examples are set forth in the accompanying drawings and the description below. Other features, objects, and advantages will be apparent from the description and drawings, and from the claims.

DETAILED DESCRIPTION

Video content includes video sequences comprised of a series of frames (or pictures). A series of frames may also be referred to as a group of pictures (GOP). For coding purposes, each video frame or picture may divided into one or more regions, which may be referred to as video blocks. As used herein, the term video block may generally refer to an area of a picture that may be coded (e.g., according to a prediction technique), sub-divisions thereof, and/or corresponding structures. Further, the term current video block may refer to an area of a picture presently being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components (RGB)). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

Figure 1:
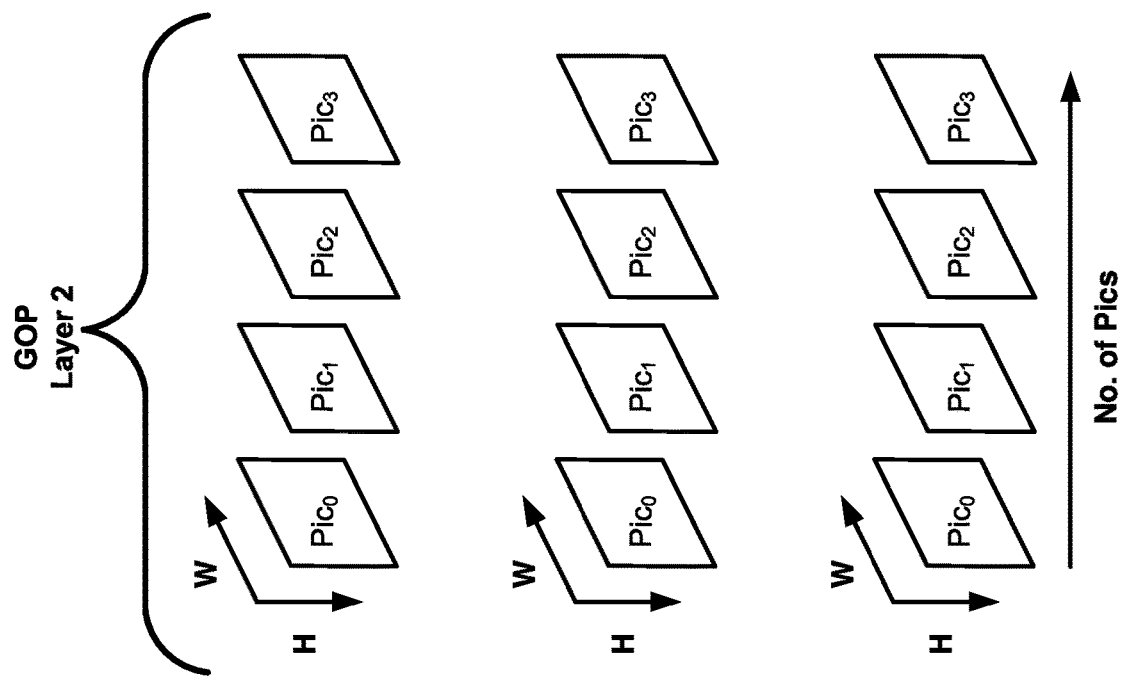
FIG. 1 is a conceptual diagram illustrating video data as a multi-dimensional data set (MDDS) in accordance with one more techniques of this disclosure.
Figure 1:
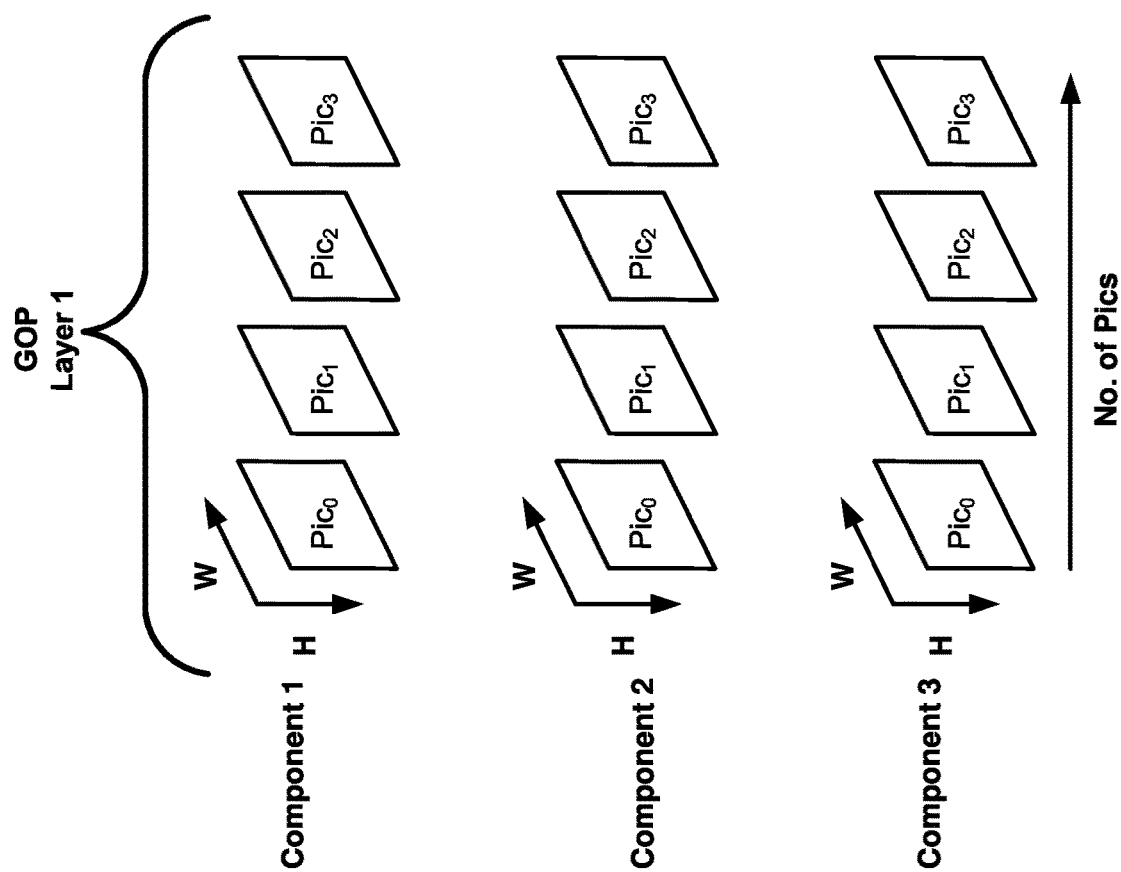

Digital video data including one or more video sequences is an example of multi-dimensional data. FIG. 1 is a conceptual diagram illustrating video data represented as multi-dimensional data. Referring to FIG. 1, the video data includes a respective group of pictures for two layers. For example, each layer may be a view (e.g., a left and a right view) or a temporal layer of video. As illustrated in FIG. 1, each layer includes three components of video data (e.g., RGB, BGR, YCbCr, etc.) and each component includes four pictures having width (W)×height (H) sample values (e.g., 1920×1080, 1280×720, etc.). Thus, in the example illustrated in FIG. 1, there are 24 W×H arrays of sample values and each array of sample values may be described as a two-dimensional data set. Further, the arrays may be grouped into sets according to one or more other dimensions (e.g., channels, components, and/or a temporal sequence of frames). For example, component 1 of the GOP of layer 1 may be described as a three-dimensional data set (i.e., W×H×Number of pictures), all of the components of the GOP of layer 1 may be described as a four-dimensional data set (i.e., W×H×Number of pictures×Number of components), and all of the components of the GOP of layer 1 and the GOP of layer 2 may described as a five-dimensional data set (i.e., W×H×Number of pictures×Number of components×Number of layers).

Multi-layer video coding enables a video presentation to be decoded/displayed as a presentation corresponding to a base layer of video data and decoded/displayed as one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. A sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream.

A video encoder operating according to a typical video coding standard may perform predictive encoding on video blocks and sub-divisions thereof. For example, pictures may be segmented into video blocks which are the largest array of video data that may be predictively encoded and the largest arrays of video data may be further partitioned into nodes. For example, in ITU-T H.265, coding tree units (CTUs) are partitioned into coding units (CUs) according to a quadtree (QT) partitioning structure. A node may be associated with a prediction unit data structure and a residual unit data structure having their roots at the node. A prediction unit data structure may include intra prediction data (e.g., intra prediction mode syntax elements) or inter prediction data (e.g., motion data syntax elements) that may be used to produce reference and/or predicted sample values for the node. For intra prediction coding, a defined intra prediction mode may specify the location of reference samples within a picture. For inter prediction coding, a reference picture may be determined and a motion vector (MV) may identify samples in the reference picture that are used to generate a prediction for a current video block. For example, a current video block may be predicted using reference sample values located in one or more previously coded picture(s) and a motion vector may be used to indicate the location of the reference block relative to the current video block. A motion vector may describe, for example, a horizontal displacement component of the motion vector (i.e., MV x), a vertical displacement component of the motion vector (i.e., MV y), and a resolution for the motion vector (i.e., e.g., pixel precision). Previously decoded pictures may be organized into one or more reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture is used to generate a prediction for a current video block and in bi-prediction, a first reference picture and a second reference picture may be used to generate a prediction for a current video block. In bi-prediction, respective sample values may be combined (e.g., added, rounded, and clipped, or averaged according to weights) to generate a prediction. Further, a typical video coding standard may support various modes of motion vector prediction. Motion vector prediction enables the value of a motion vector for a current video block to be derived based on another motion vector. For example, a set of candidate blocks having associated motion information may be derived from spatial neighboring blocks to the current video block and a motion vector for the current video block may be derived from a motion vector associated with one of the candidate blocks.

As described above, intra prediction data or inter prediction data may be used to produce reference sample values for a current block of sample values. The difference between sample values included in a current block and associated reference samples may be referred to as residual data. Residual data may include respective arrays of difference values corresponding to each component of video data. Residual data may initially be calculated in the pixel domain. That is, from subtracting sample amplitude values for a component of video data. A transform, such as, a discrete cosine transform (DCT), a discrete sine transform (DST), an integer transform, a wavelet transform, or a conceptually similar transform, may be applied to an array of sample difference values to generate transform coefficients. It should be noted that in some cases, a core transform and a subsequent secondary transforms may be applied to generate transform coefficients. A quantization process may be performed on transform coefficients or residual sample values directly (e.g., in the case, of palette coding quantization). Quantization approximates transform coefficients (or residual sample values) by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding and/or offset addition operations. It should be noted that as used herein the term quantization process in some instances may refer to generating level values (or the like) in some instances and recovering transform coefficients (or the like) in some instances. That is, a quantization process may refer to quantization in some cases and inverse quantization (which also may be referred to as dequantization) in some cases. Further, it should be noted that although in some of the examples quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a prediction for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, as implemented in ITU-T H.265 may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein, each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context may provide a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in a current syntax element and previously coded syntax elements.

Figure 2A:
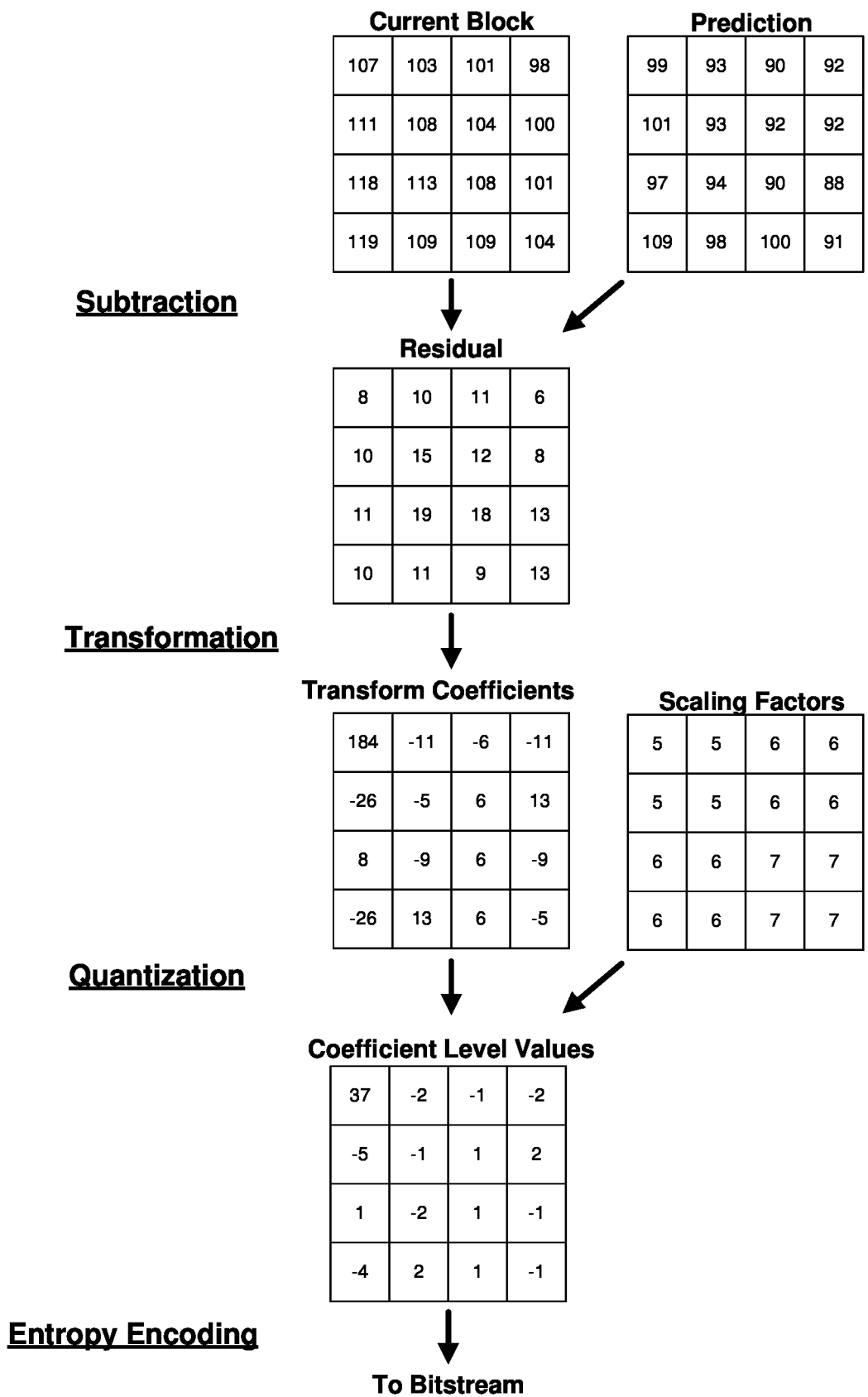
FIGS. 2A-2B are conceptual diagrams illustrating examples of coding a block of video data with typical video coding techniques which may be utilized in accordance with one or more techniques of this disclosure.
Figure 2B:
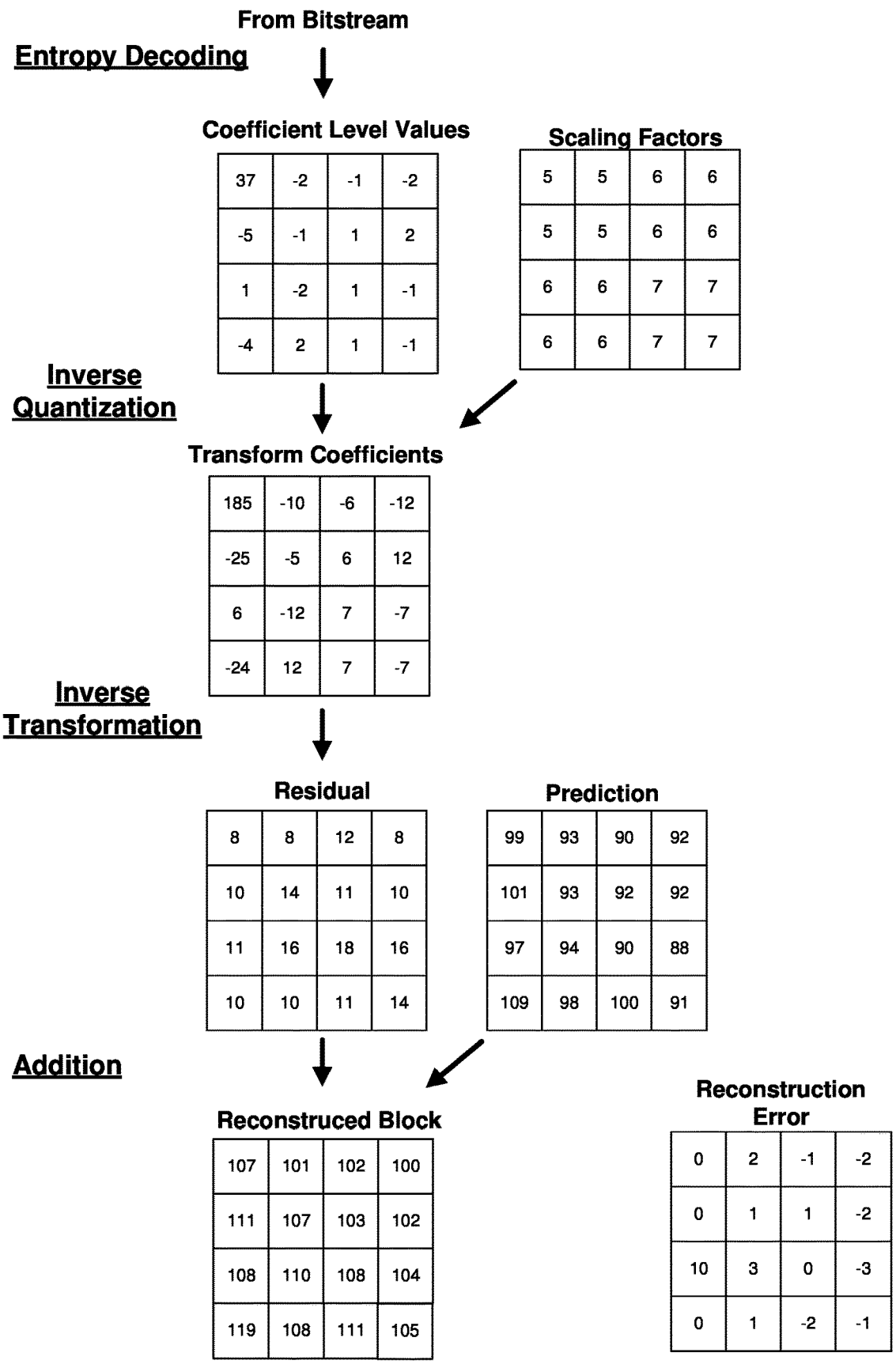

FIGS. 2A-2B are conceptual diagrams illustrating examples of coding a block of video data. As illustrated in FIG. 2A, a current block of video data (e.g., an area of a picture corresponding to a video component) is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In particular, FIG. 2B illustrates a reconstruction error which is the difference between the current block and the reconstructed block. In this manner, coding may be said to be lossy. However, the difference in sample values may be considered minimally perceptible to a viewer of the reconstructed video. That is, the reconstructed video may be said to be fit for human-consumption. However, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize a reconstruction error and/or minimize perceivable artifacts introduced by a video coding process. Such modifications may generally be referred to as filtering. It should be noted that filtering may occur as part of an in-loop filtering process or a post-loop filtering process. For an in-loop filtering process, the resulting sample values of a filtering process may be used for further reference and for a post-loop filtering process the resulting sample values of a filtering process are merely output as part of the decoding process (e.g., not used for subsequent coding).

Typical video coding standards may utilize so-called deblocking (or de-blocking), which refers to a process of smoothing the boundaries of neighboring reconstructed video blocks (i.e., making boundaries less perceptible to a viewer) as part of an in-loop filtering process. In addition to applying a deblocking filter as part of an in-loop filtering process, a typical video coding standard may utilized Sample Adaptive Offset (SAO), where SAO is a process that modifies the deblocked sample values in a region by conditionally adding an offset value. Further, a typical video coding standard may utilized one or more additional filtering techniques. For example, in VVC, a so-called adaptive loop filter (ALF) may be applied.

As described above, for coding purposes, each video frame or picture may divided into one or more regions, which may be referred to as video blocks. It should be noted that in some cases, other overlapping and/or independent regions may be defined. For example, according to typical video coding standards, each video picture may be partitioned to include one or more slices and further partitioned to include one or more tiles. With respect to VVC, slices are required to consist of an integer number of complete tiles or an integer number of consecutive complete CTU rows within a tile, instead of only being required to consist of an integer number of CTUs. Thus, in VVC, a picture may include a single tile, where the single tile is contained within a single slice or a picture may include multiple tiles where the multiple tiles (or CTU rows thereof) may be contained within one or more slices. Further, it should be noted that VVC provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, a bitstream of coded video data may include a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 3:
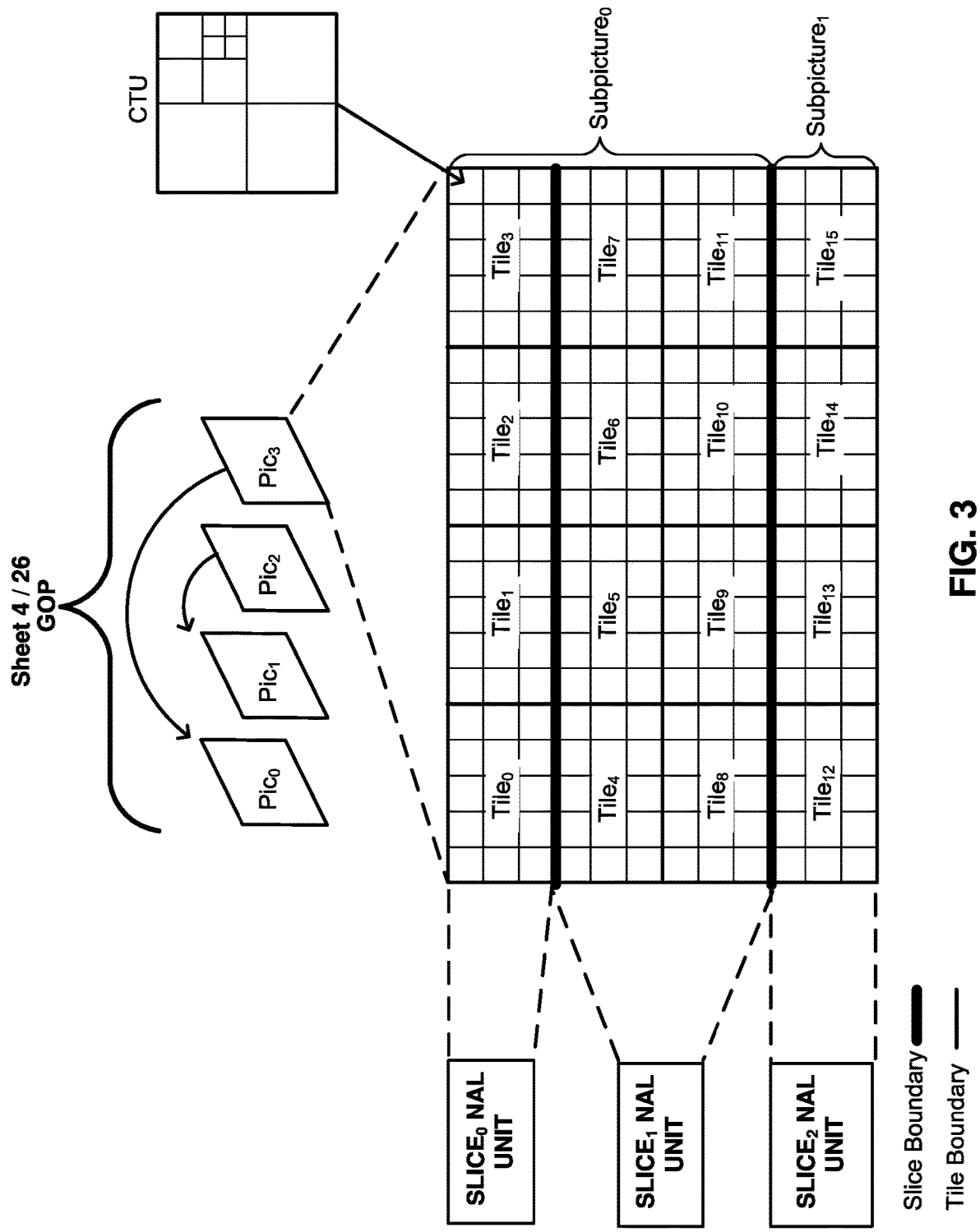
FIG. 3 is a conceptual diagram illustrating coded video data and corresponding data structures associated with typical video coding techniques which may be utilized in accordance with one or more techniques of this disclosure.

FIG. 3 is a conceptual diagram illustrating an example of a picture within a group of pictures partitioned according to tiles, slices, and subpictures and the corresponding coded video data encapsulated into NAL units. It should be noted that the techniques described herein may be applicable to tiles, slices, subpictures, sub-divisions thereof and/or equivalent structures thereto. That is, the techniques described herein may be generally applicable regardless of how a picture is partitioned into regions. In the example illustrated in FIG. 3, $Pic_3$ is illustrated as including 16 tiles (i.e., $Tile_0$ to $Tile_{15}$) and three slices (i.e., $Slice_0$ to $Slice_2$). In the example illustrated in FIG. 3, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 3, $Pic_3$ includes two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 3, $Subpicture_0$ may corresponding to an action portion of a sporting event presentation (e.g., a view of the field) and $Subpicture_1$ may corresponding to a scrolling banner displayed during the sporting event presentation. By organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_1$ NAL unit may be decoded and displayed.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. According to a typical video coding standard, when a picture is decoded it may be stored to a decoded picture buffer (DPB) (which may be referred to as frame buffer, a reference buffer, a reference picture buffer, or the like). For example, referring to FIG. 3, $Pic_2$ is illustrated as referencing $Pic_1$. Similarly, $Pic_3$ is illustrated as referencing $Pic_0$. With respect to FIG. 3, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown) and assuming $Pic_1$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

Figure 4:
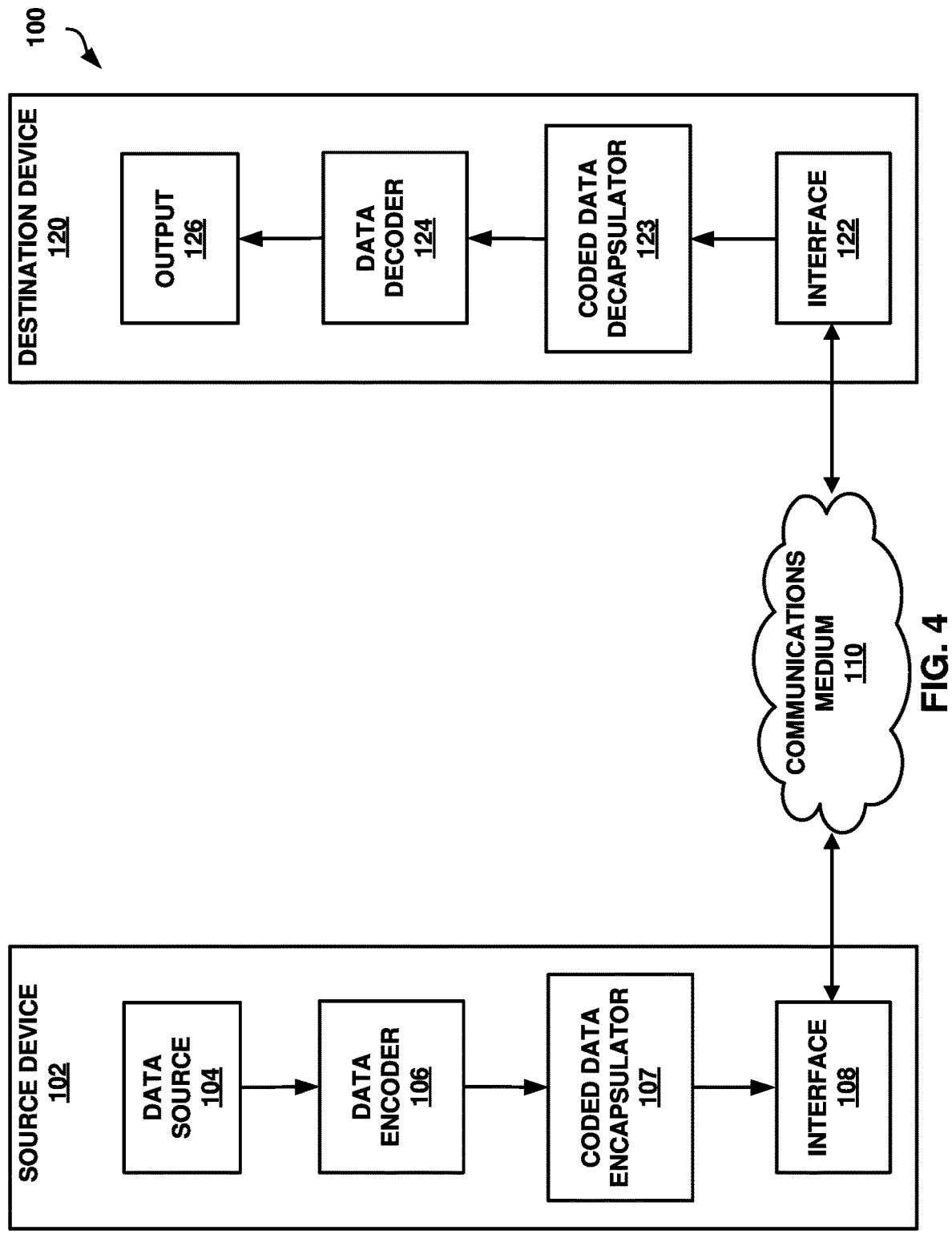
FIG. 4 is a block diagram illustrating an example of a system that may be configured to encode and decode multi-dimensional data according to one or more techniques of this disclosure.

FIG. 4 is a block diagram illustrating an example of a system that may be configured to code (i.e., encode and/or decode) a multi-dimensional data set (MDDS) according to one or more techniques of this disclosure. It should be noted that in some cases an MDDS may be referred to as a tensor. System 100 represents an example of a system that may encapsulate coded data according to one or more techniques of this disclosure. As illustrated in FIG. 4, system 100 includes source device 102, communications medium 110, and destination device 120. In the example illustrated in FIG. 4, source device 102 may include any device configured to encode multi-dimensional data and transmit encoded data to communications medium 110. Destination device 120 may include any device configured to receive encoded data via communications medium 110 and to decode encoded data. Source device 102 and/or destination device 120 may include computing devices equipped for wired and/or wireless communications and may include, for example, set top boxes, digital video recorders, televisions, computers, gaming consoles, medical imaging devices, and mobile devices, including, for example, smartphones.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 4, source device 102 includes data source 104, data encoder 106, coded data encapsulator 107, and interface 108. Data source 104 may include any device configured to capture and/or store multi-dimensional data. For example, data source 104 may include a video camera and a storage device operably coupled thereto. Data encoder 106 may include any device configured to receive multi-dimensional data and generate a bitstream representing the data. A bitstream may refer to a general bitstream (i.e., binary values representing coded data) or a compliant bitstream where aspects of a compliant bitstream may be defined according to a standard, e.g., a video coding standard. Coded data encapsulator 107 may receive a bitstream and encapsulate the bitstream for purposes of storage and/or transmission. For example, coded data encapsulator 107 may encapsulate bitstream according to a file format. It should be noted that coded data encapsulator 107 need not necessarily be located in the same physical device as data encoder 106. For example, functions described as being performed by data source 104, data encoder 106 and/or coded data encapsulator 107 may be distributed among devices in a computing system (e.g., at distinct server locations, etc.). Interface 108 may include any device configured to receive data generated by coded data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 4, destination device 120 includes interface 122, coded data decapsulator 123, data decoder 124, and output 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Coded data decapsulator 123 may be configured to receive and extract a bitstream from an encapsulated format. For example, in the case of video coded according to a typical video coding standard stored on physical medium according to a defined file format, coded data decapsulator 123 may be configured to extract a compliant bitstream from the file. Data decoder 124 may include any device configured to receive a bitstream and/or acceptable variations thereof and reproduce multi-dimensional data therefrom. Reproduced multi-dimensional data may then be received by output 126. For example, in the case of video, output 126 may include a display device configured to display video data. Further, it should be noted that data decoder 124 may be configured to output multi-dimensional data to various types of devices and/or sub-components thereof. For example, data decoder 124 may be configured to output data to any communication medium. Further, as described above, the techniques described in this disclosure may be particularly useful for allowing machine tasks to be distributed across a communications network. Thus, in some examples, source device 102 may represent an acquisition device where data source 104 acquires video data and generates corresponding feature data, data encoder 106 compresses feature data e.g., according to one or more techniques described herein, and destination device 120 is a device that performs analysis and inference on the reconstructed feature data. It should be noted, for example, with respect to the example described above, data encoder 106 and data decoder 124 may be configured to code multiple types of data. For example, in the case of video data, data encoder 106 may receive source video and corresponding feature data and generate a compliant bitstream according to a video coding standard and generate a bitstream including compressed feature data, e.g., according to the techniques described herein. In this case, in one example, destination device 120 may be a headend type of device that reconstructs video (e.g., a high quality representation) and the feature data from a received bitstreams and encodes the reconstructed video based on the feature data, e.g., at output 126, for further distribution (e.g., to nodes in a media distribution system).

Figure 5:
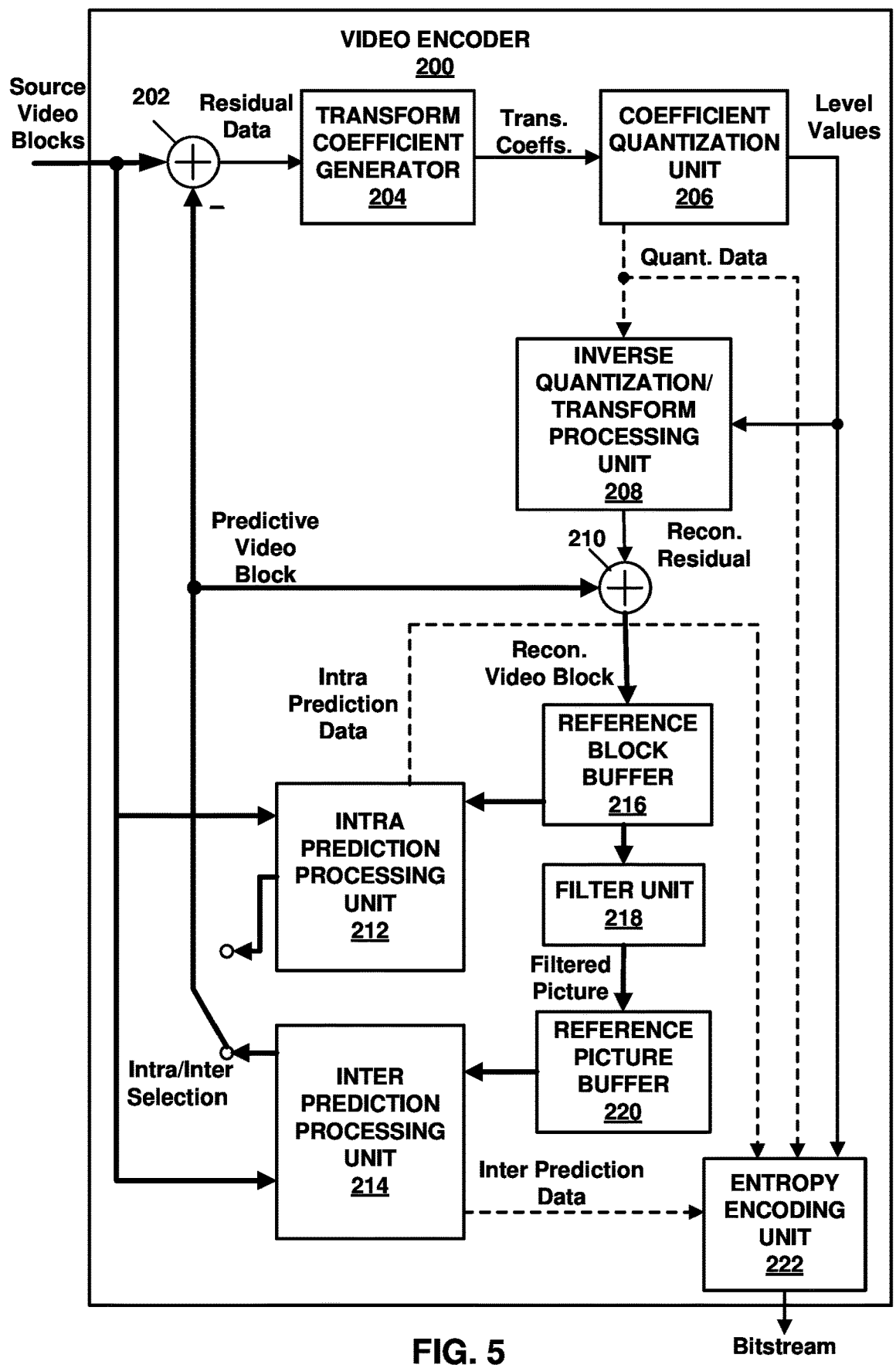
FIG. 5 is a block diagram illustrating an example of a video encoder that may be configured to encode video data in accordance with typical video encoding techniques which may be utilized with one or more techniques of this disclosure.

As described above, data encoder 106 may include any device configured to receive multi-dimensional data and an example of multi-dimensional data includes video data which may be coded according to a typical video coding standard. As described in further detail below, in some example, techniques for coding multi-dimensional data described herein may be utilized in conjunction with techniques utilized in typical video standards. FIG. 5 is a block diagram illustrating an example of a video encoder that may be configured to encode video data in accordance with typical video encoding techniques. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. Video encoder 200 may perform intra prediction coding and inter prediction coding of picture areas, and, as such, may be referred to as a hybrid video encoder. In the example illustrated in FIG. 5, video encoder 200 receives source video blocks. In some examples, source video blocks may include areas of picture that has been divided according to a coding structure. For example, source video data may include CTUs, sub-divisions thereof, and/or another equivalent coding unit. In some examples, video encoder 200 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 200 includes summer 202, transform coefficient generator 204, coefficient quantization unit 206, inverse quantization and transform coefficient processing unit 208, summer 210, intra prediction processing unit 212, inter prediction processing unit 214, reference block buffer 216, filter unit 218, reference picture buffer 220, and entropy encoding unit 222. As illustrated in FIG. 5, video encoder 200 receives source video blocks and outputs a bitstream.

In the example illustrated in FIG. 5, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a DCT or a conceptually similar transform, to the residual block or sub-divisions thereof (e.g., four 8×8 transforms may be applied to a 16×16 array of residual values) to produce a set of transform coefficients. Transform coefficient generator 204 may be configured to perform any and all combinations of the transforms included in the family of discrete trigonometric transforms, including approximations thereof. Transform coefficient generator 204 may output transform coefficients to coefficient quantization unit 206. Coefficient quantization unit 206 may be configured to perform quantization on the transform coefficients. The quantization process may reduce the bit depth associated with some or all of the coefficients. The degree of quantization may alter the rate-distortion (i.e., bit-rate vs. quality of video) of encoded video data. In a typical video coding standard, the degree of quantization may be modified by adjusting a quantization parameter (QP) and a quantization parameter may be determined based on signaled and/or predicted values. Quantization data may include any data used to determine a QP for quantizing a particular set of transform coefficients. As illustrated in FIG. 5, quantized transform coefficients (which may be referred to as level values) are output to inverse quantization and transform coefficient processing unit 208. Inverse quantization and transform coefficient processing unit 208 may be configured to apply an inverse quantization and an inverse transformation to generate reconstructed residual data. As illustrated in FIG. 5, at summer 210, reconstructed residual data may be added to a predictive video block. Reconstructed video blocks may be stored to reference block buffer 216 and used as reference for predicting subsequent blocks (e.g., using intra prediction).

Referring again to FIG. 5, intra prediction processing unit 212 may be configured to select an intra prediction mode for a video block to be coded. Intra prediction processing unit 212 may be configured to evaluate reconstructed blocks stored to reference block buffer 216 and determine an intra prediction mode to use to encode a current block. In a typical video coding standard, possible intra prediction modes may include planar prediction modes, DC prediction modes, and angular prediction modes. As illustrated in FIG. 5, intra prediction processing unit 212 outputs intra prediction data (e.g., syntax elements) to entropy encoding unit 222.

Referring again to FIG. 5, inter prediction processing unit 214 may be configured to perform inter prediction coding for a current video block. Inter prediction processing unit 214 may be configured to receive source video blocks, select a reference picture from pictures stored to the reference buffer 220, and calculate a motion vector for a video block. A motion vector may indicate the displacement of a prediction unit of a video block within a current video picture relative to a predictive block within a reference picture. Inter prediction coding may use one or more reference pictures. Inter prediction processing unit 214 may be configured to select predictive block(s) by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within reference picture buffer 220. It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 222.

Referring again to FIG. 5, filter unit 218 receives reconstructed video blocks from reference block buffer 216 and outputs a filtered picture to reference picture buffer 220. That is, in the example of FIG. 5, filter unit 218 is part of an in-loop filtering process. Filter unit 218 may be configured to perform one or more of deblocking, SAO filtering, and/or ALF filtering, for example, according to a typical video coding standard. Entropy encoding unit 222 receives data representing level values (i.e., quantized transform coefficients) and predictive syntax data (i.e., intra prediction data and motion prediction data). It should be noted that data representing level values may include for example, flags, absolute values, sign values, delta values, and the like. For example, significant coefficient flags and the like as provided in a typical video coding standard. Entropy encoding unit 222 may be configured to perform entropy encoding according to one or more of the techniques described herein and output a bitstream, for example, a compliant bitstream according to a typical video coding standard.

Figure 6:
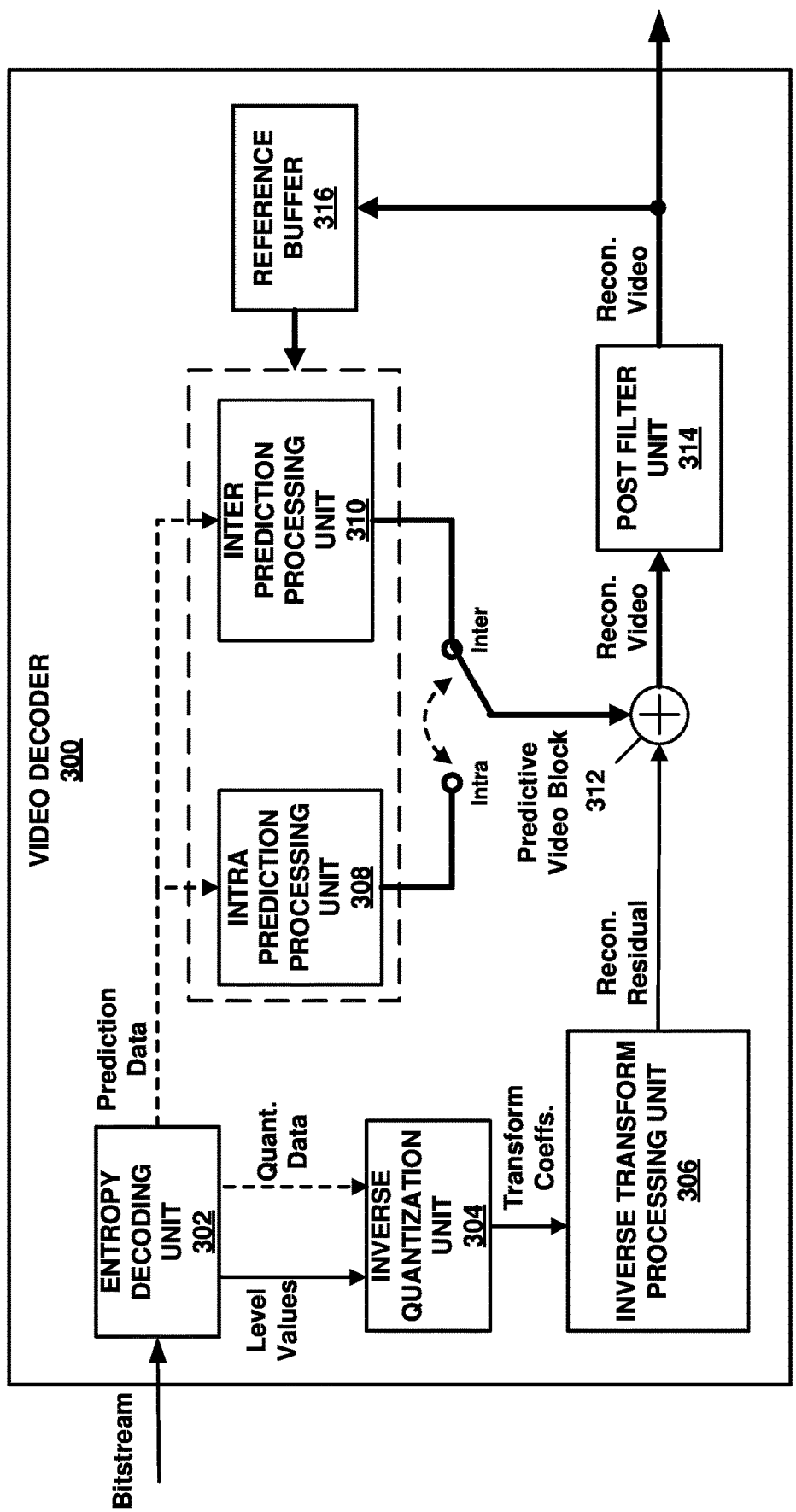
FIG. 6 is a block diagram illustrating an example of a video decoder that may be configured to decode video data in accordance with typical video decoding techniques which may be utilized with one or more techniques of this disclosure.

Referring again to FIG. 4, as described above, data decoder 124 may include any device configured to receive coded multi-dimensional data and an example of coded multi-dimensional data includes video data which may be coded according to a typical video coding standard. FIG. 6 is a block diagram illustrating an example of a video decoder that may be configured to decode video data in accordance with typical video decoding techniques which may be utilized with one or more techniques of this disclosure. In the example illustrated in FIG. 6, video decoder 300 includes an entropy decoding unit 302, inverse quantization unit 304, inverse transform coefficient processing unit 306, intra prediction processing unit 308, inter prediction processing unit 310, summer 312, post filter unit 314, and reference buffer 316. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 6, entropy decoding unit 302 receives an entropy encoded bitstream. Entropy decoding unit 302 may be configured to decode syntax elements and level values from the bitstream according to a process reciprocal to an entropy encoding process. Entropy decoding unit 302 may be configured to perform entropy decoding according any of the entropy coding techniques described above and/or determine values for syntax elements in an encoded bitstream in a manner consistent with a video coding standard. As illustrated in FIG. 6, entropy decoding unit 302 may determine level values, quantization data, and prediction data from a bitstream. In the example, illustrated in FIG. 6, inverse quantization unit 304 receives quantization data and level values and outputs transform coefficients to inverse transform coefficient processing unit 306. Inverse transform coefficient processing unit 306 outputs reconstructed residual data. Thus, inverse quantization unit 304 and inverse transform coefficient processing unit 306 operate in a similar manner to inverse quantization and transform coefficient processing unit 208 described above.

Referring again to FIG. 6, reconstructed residual data is provided to summer 312. Summer 312 may add reconstructed residual data to a predictive video block and generate reconstructed video data. A predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more pictures (and corresponding regions) of video data. Intra prediction syntax elements may identify an intra prediction mode, such as the intra prediction modes described above. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Post filter unit 314 may be configured to perform filtering on reconstructed video data. For example, post filter unit 314 may be configured to perform deblocking based on parameters specified in a bitstream. Further, it should be noted that in some examples, post filter unit 314 may be configured to perform proprietary discretionary filtering (e.g., visual enhancements, such as, mosquito noise reduction). As illustrated in FIG. 6, a reconstructed video may be output by video decoder 300, for example, to a display.

As described above with respect to FIGS. 2A-2B, a block of video data, i.e., an array of data included within a MDDS, may be encoded by generating a residual, performing a transformation on the residual, and quantizing the transform coefficients to generate level values and decoded by performing inverse quantization on level values, performing an inverse transform, and adding the resulting residual to a prediction. An array of data included within a MDDS may also be coded using so-called autoencoding techniques. Generally, autoencoding may refer to a learning technique that imposes a bottleneck into a network to force a compressed representation of an input. That is, an autoencoder may be referred to as a non-linear Primary Component Analysis (PCA) that tries to represent input data in a lower dimensional space. An example of an autoencoder includes a convolution autoencoder that compresses an input using a single convolution operation. Convolution autoencoders may be utilized in so-called deep convolutional neural networks (CNNs).

Figure 7A:
FIGS. 7A-7B are conceptual diagrams illustrating examples of coding a block of video data in accordance with autoencoding techniques which may be utilized with one or more techniques of this disclosure.

FIG. 7A illustrates an example of autoencoding using a two-dimensional discrete convolution. In the example illustrated in FIG. 7A, a discrete convolution is performed on a current block of video data (i.e., the block of video data illustrated in FIG. 2A) to generate an output feature map (OFM), where the discrete convolution is defined according to a padding operation, a kernel, and a stride function. It should be noted that although FIG. 7A illustrates a discrete convolution on a two-dimensional input using a two-dimensional kernel, discrete convolution may be performed on higher dimensional data sets. For example, discrete convolution may be performed a three-dimensional input using a three-dimensional kernel (e.g., a cubic kernel). In the case of video data, such a convolution may down-sample video in both the spatial and temporal dimensions. Further, it should be noted that although the example illustrated in FIG. 7A illustrates where a square kernel is convolved over a square input, in other examples, the kernel and/or the input may be non-square rectangles. In the example illustrated in FIG. 7A, the 4×4 array of video data is upscaled to a 6×6 array by duplicating the nearest value at the boundary. This is an example of a padding operation. In general, a padding operation increases the size of an input data set by inserting values. In a typical case, zero values may be inserted into an array in order to achieve a particular sized array prior to convolution. It should be noted that padding functions may include one or more of inserting zero's (or another default value) at particular locations, symmetric extension, replicate extension, circular extension at various positions of a data set. For example, for symmetric extension, input array values outside the bounds of the array may be computed by mirror-reflecting the array across the array border along the dimension being padded. For replicate extension, input array values outside the bounds of the array may be assumed to equal the nearest array border value along the dimension being padded. For circular extension, input array values outside the bounds of the array may be computed by implicitly assuming the input array is periodic along the dimension being padded.

Referring again to FIG. 7A, an output feature map is generated by convolving a 3×3 kernel over the 6×6 array according to a stride function. That is, the stride illustrated in FIG. 7A illustrates the top-left position of the kernel at a corresponding position in the 6×6 array. That is, for example, at stride position 1, the top-left of the kernel is aligned with the top-left of the 6×6 array. At each discrete position of the stride, the kernel is used to generate a weighted sum. Generated weighted sum values are then used to populate a corresponding position in an output feature map. For example, at position 1 of the stride function, the output of 107 ($107=1/16*107+1/8*107+1/16*103+1/8*107+1/4*107+1/8*103+1/16*111+1/8*111+1/16*108$) corresponds to the top-left position of the output feature map. It should be noted that in the example illustrated in FIG. 7A, the stride function corresponds to a so-called unit stride, i.e., the kernel slides across every position of the input. In other examples, non-unit or arbitrary strides may be used. For example, a stride function may include only the positions 1, 4, 13, and 16 in the stride illustrated in FIG. 7A to generate a 2×2 output feature map. In this manner, in the case of two-dimensional discrete convolution, for an input data having a width, $w_i$, and height, $h_i$, an arbitrary padding function, an arbitrary stride function, and a kernel having a width, $w_k$, and height, $h_k$, may be used to create an output feature map having a desired width, $w_o$, and height, $h_o$. It should be noted, that similar to a kernel, a stride function may be defined for multiple dimensions (e.g., a three-dimensional stride function may be defined). It should be noted that in some cases, for particular kernel size and stride function, the kernel may lie outside of the support region. In some cases, the output at such a position is not valid. In some cases, a corresponding value is derived for the out-of-bound support position, e.g., according to a padding operation.

It should be noted that in the example illustrated in FIG. 7A, the 4×4 array of video data is illustrated as being down-sampled to a 2×2 output feature map by selecting the underlined values of the 4×4 output feature map. The 4×4 output feature map is shown for illustration purposes. That is, to illustrate a typical unit stride function. In a typical case, computations would not be made for discarded values. In a typical case, as described above, the 2×2 output feature map could/would be derived by performing the weighted sum operation with the kernel at positions 1, 4, 13, and 16. However, it should be noted that in other examples, so-called pooling operations, such as finding a maximum pooling, may be performed on an input (prior to performing the convolution) or an output feature map to down-sample a data set. For example, in the example illustrated in FIG. 7A, the 2×2 output feature map may be generated by taking a local maximum of each 2×2 region in the 4×4 output feature map (i.e., 108, 104, 117, and 108). That is, there may be numerous ways to perform autoencoding that includes per-forming convolutions on input data in order to represent the data as a down-sampled output feature map.

Finally, as indicated in FIG. 7A, an output feature map may be quantized in a manner similar to that described above with respect to transform coefficients (e.g., amplitudes restricted to a set of specified values). In the example illustrated in FIG. 7A, the amplitudes of the 2×2 output feature map are quantized by division by 2. In this case, quantization may be described as a uniform quantization defined by:

$$QOFM(x,y) = \text{round}(OFM(x,y)/\text{Stepsize})$$

Where,

QOFM(x,y) is a quantized value corresponding position (x, y);

OFM(x,y) is a value corresponding position (x, y);

Stepsize is a scalar; and round(x) rounds x to the nearest integer.

Thus, for the example illustrated in FIG. 7A, Stepsize=2 and x=0 . . . 1, y=0 . . . 1. In this example, at an autodecoder, the inverse quantization for deriving the recovered output feature map, ROFM(x,y) may be defined as follows:

$$ROFM(x,y) = QOFM(x,y) * \text{Stepsize}$$

It should be noted that in one example, a respective Stepsize may be provided for each position, i.e., $\text{Stepsize}_{(x,y)}$. It should be noted that this may be referred to a uniform quantization, as across the range of possible amplitudes at a position in OFM(x,y) the quantization (i.e., scaling) is same.

In one example, quantization may be non-uniform. That is, the quantization may differ across the range of possible amplitudes. For example, respective Stepsizes may vary across a range of values. That is, for example, in one example, a non-uniform quantization function may be defined as follows:

$$QOFM(x, y) = \text{round}\left(OFM(x, y)/\text{Stepsize}_i\right)$$

Where $$\text{Stepsize}_i = \text{scalar}_0: \quad \text{if } OFM(x, y) < \text{value}_0$$
$$\text{scalar}_0: \quad \text{if } \text{value}_0 \leq OFM(x, y) \leq \text{value}_1$$
$$\ldots$$
$$\text{scalar}_{N-1}: \quad \text{if } \text{value}_{N-2} \leq OFM(x, y) \leq \text{value}_{N-1}$$
$$\text{scalar}_N: \quad \text{if } OFM(x, y) > \text{value}_{N-1}$$

Further, it should be noted that as described above, quantization may include mapping an amplitude in a range to a particular value. That is, for example, in one example, non-uniform quantization function may be defined as:

$$QOFM(x, y) = \begin{cases} s_o & OFM(x, y) < \text{value}_0 \\ s_1 & \text{value}_0 \leq OFM(x, y) < \text{value}_1 \\ \vdots & \vdots \\ s_N & \text{value}_N \leq OFM(x, y) \end{cases}$$

Where, $\text{value}_{i+1} > \text{value}_i$ and $\text{value}_{i+1} - \text{value}_i$ does not have to equal $\text{value}_{j+1} - \text{value}_j$ for $i \neq j$ The inverse of the non-uniform quantization process, may be defined as:

$$ROFM(x, y) = \begin{cases} r_o & QOFM(x, y) = s_0 \\ r_1 & QOFM(x, y) = s_1 \\ \vdots & \vdots \\ r_N & QOFM(x, y) = s_N \end{cases}$$

The inverse process corresponds to a lookup table and may be signaled in the bitstream.

Finally, it should be noted that combinations of the quantization techniques described above may be utilized and in some cases, specific quantization functions may be specified and signaled. For example, quantization tables may be signaled in a manner similar to signaling of quantization tables in VVC.

Referring again to FIG. 7A, although not shown, but as described in further detail below, entropy encoding may be performed on quantized output feature map data. Thus, as illustrated in the example of FIG. 7A, the quantized output feature map is a compressed representation of the current video block.

Figure 7B:
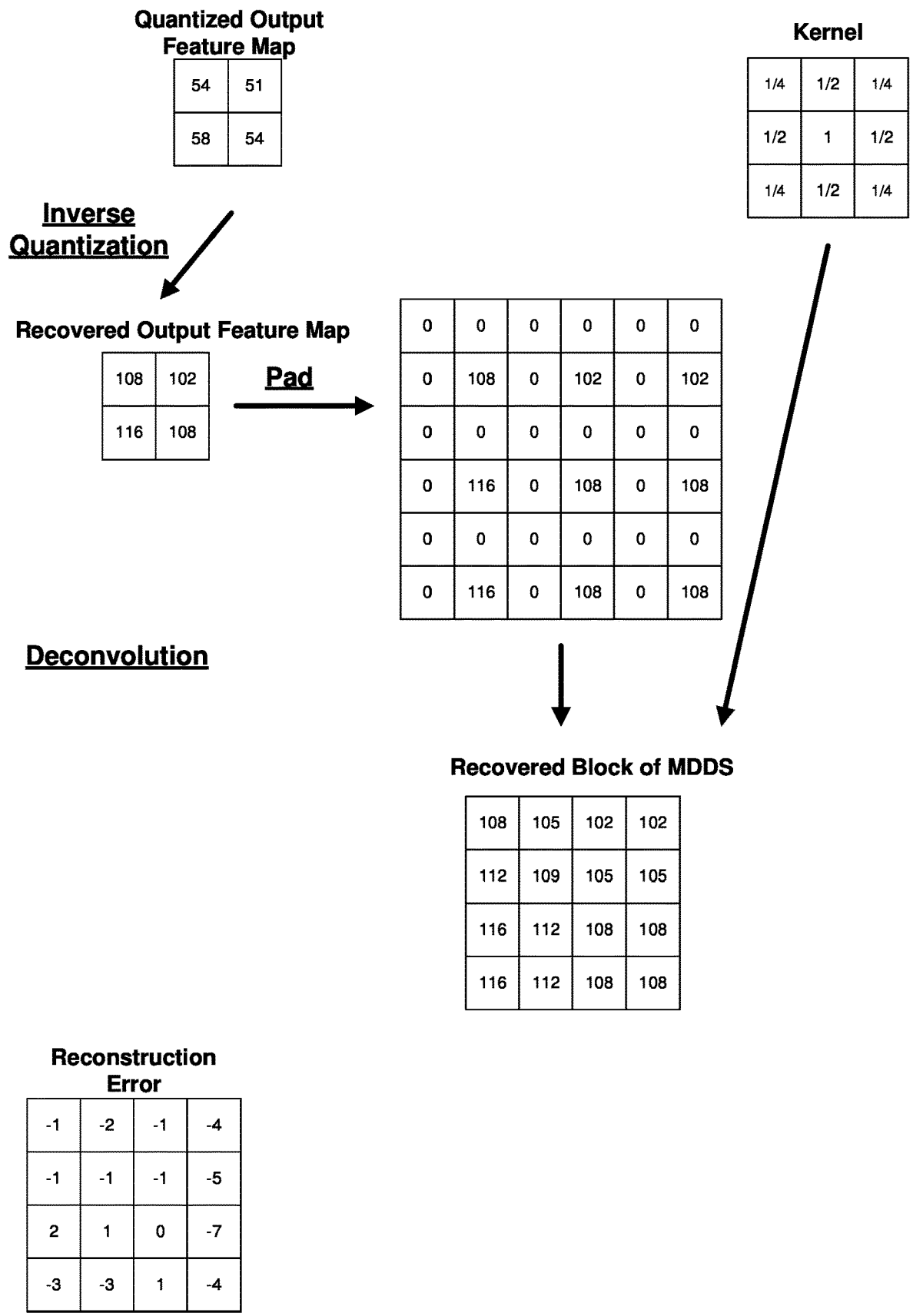

As illustrated in FIG. 7B, the current block of video data is decoded by performing inverse quantization on the quantized output feature map, performing a padding operation on the recovered output feature map, and convolving the padded output feature map with a kernel. Similar to FIG. 2B, FIG. 7B illustrates a reconstruction error which is the difference between current block and recovered block. It should be noted that the padding operation performed in FIG. 7B is different than the padding operation performed in FIG. 7A and the kernel utilized in FIG. 7B is different than the kernel utilized in FIG. 7A. That is, in the example illustrated in FIG. 7B, zero values are interleaved with the recovered output feature map, and the 3×3 kernel in convolved over the 6×6 input using a unit stride resulting in the recovered block of MDDS. It should be noted that such a convolution operation performed during autodecoding may be referred to a convolution-transpose (convT). It should be noted that a convolution-transpose, in some cases may define a specific relationship between kernels at each of an autoencoder and autodecoder and in other cases, the term convolution-transpose may be more general. It should be noted that there may be several ways in which autodecoding may be implemented. That is, FIG. 7B provides an illustrative case of a convolution-transpose and there numerous ways in which a convolution-transpose (and autodecoding) may be performed and/or implemented. The techniques described herein are generally applicable to autodecoding. For example, with respect to the example illustrated in FIG. 7B, in a simple case, each of the four values illustrated in the recovered output feature map may be duplicated to create a 4×4 array (i.e., an array having its top-left four values as 108, its top-right four values as 102, its bottom-left four values as 116, and its bottom-right four values as 108). Further, other padding operations, kernels, and/or stride functions may be utilized. Essentially, at an autodecoder, an autodecoding process may be selected in a manner that achieves a desired objective, for example, reducing a reconstruction error. It should be noted the other desired objectives may include reducing visual artifacts, increasing the probability an object is detected, etc.

As described above, with respect to FIGS. 7A-7B, autoencoding may be performed on video data to generate a quantized output feature map data. A quantized output feature map is a compressed representation of the current video block. In some cases, that is, based on how autoencoding is performed an output feature maps may effectively be a down-sampled version of video data. For example, referring to FIG. 7A, the 4×4 array of video data may be compressed to a 2×2 array. In a case where the 4×4 array of video data is one of several 4×4 arrays of video data included in a 1920×1080 resolution picture, autoencoding each 4×4 array as illustrated in FIG. 7A effectively down-samples the 1920×1080 resolution picture to a 960×540 resolution picture. As described in further detail below, such a down-sampled representation of video data may be coded according to a typical video coding standard.

It should be noted that in addition to performing discrete convolution on two-dimensional (2D) data sets, convolution may be performed on one-dimensional data sets (1D) or on higher dimensional data sets (e.g., 3D data sets). Thus, there are several ways in which video data may be mapped to a multi-dimensional data set. In general, video data may be described as having a number of input channels of spatial data. That is, video data may be described as an $N_i \times W \times H$, data set where $N_i$ is the number of input channels, W is a spatial width, and H is a spatial height. It should be noted that $N_i$, in some examples, may be a temporal dimension (e.g., number of pictures). For example, $N_i$ in $N_i \times W \times H$ may indicate a number of 1920×1080 monochrome pictures. Further, in some examples, $N_i$, may be a component dimension (e.g., number of color components). For example, $N_i \times W \times H$ may include a single 1024×742 image having RGB components, i.e., in this case, $N_i$ equals 3. Further, it should be noted that in some cases, there may be N input channels for both a number of components (e.g., $N_{Ci}$) and a number of pictures (e.g., $N_{Pi}$). In this case, video data may be specified as $N_{Ci} \times N_{Pi} \times W \times H$, i.e., as a four-dimensional data set. According to the $N_{Ci} \times N_{Pi} \times W \times H$ format, an example of 60×1920×1080 monochrome pictures may be expressed as 1×60×1920×1080 and a single 1024×742 RGB image may be expressed as 3×1×1024×742. It should be noted that in these cases, each of the four-dimensional data sets have a dimension having a size of 1, and may be referred to as three-dimensional data sets and respectively simplified to 60×1920×1080 and 3×1024×742. That is, 60 and 3 are both input channels in three-dimensional data sets, but refer to different dimensions (i.e., temporal and component).

As described above, in some cases, a 2D OFM may correspond to a down-sampled component of video (e.g., luma) in both the spatial and temporal dimensions. Further, in some cases, a 2D OFM may correspond to a down-sampled video in both the spatial and component dimensions. That is, for example, a single 1024×742 RGB image, (i.e., 3×1024×742) may be down-sampled to a 1×342×248 OFM. That is, down-sampled by 3 in both spatial dimensions and down-sampled by 3 in the component dimension. It should be noted that in this case, 1024 may be padded by 1 to 1025 and 743 may be padded by 2 to 744, such that each are multiples of 3. Further, in one example, 60 1920×1080 monochrome pictures (i.e., 60×1920×1080) may be down-sampled to a 1×640×360 OFM. That is, down-sampled by 3 in both spatial dimensions and down-sampled by 60 in the temporal dimension.

It should be noted that in the cases above, the down-sampling may be achieved by having a $N_i \times 3 \times 3$ kernel with a stride of 3 in the spatial dimension. That is, for the 3×1025×744 data set, the convolution generates a single value for each 3×3×3 data point and for the 60×1920×1080 data set, the convolution generates a single value for each 60×3×3 data point. It should be noted that in some cases, it may be useful to perform discrete convolution on a data set multiple times, e.g., using multiple kernels and/or strides. That is, for example, with respect to the example described above, a number of instances of $N_i \times 3 \times 3$ kernels (e.g., each with different values) may be defined and used to generate a corresponding number of instances of OFMs. In this case, the number of instances may be referred to as a number of output channels, i.e., $N_O$. Thus, in the case where an $N_i \times W_i \times H_i$ input data set is down-sampled according to a $N_O$ instances of $N_i \times W_k \times H_k$ kernels, the resulting output data may be represented as $N_O \times W_O \times H_O$. Where $W_O$ is a function of $W_i$, $W_k$, and the stride in the horizontal dimension and $H_O$ is a function of $H_i$, $H_k$, and the stride in the vertical dimension. That is, each of $W_O$ and $H_O$ are determined according to spatial down-sampling. It should be noted that in some examples, according to the techniques herein, an $N_O \times W_O \times H_O$ data set may be used for object/feature detection. That is, for example, each of the $N_O$ data sets may be compared to one another and relationships in common regions may be used to identify the presence of an object (or another feature) in the original $N_i \times W_i \times H_i$ input data set. For example, a comparison/task may be carried out over a multiple of NN layers. Further, an algorithm, such as, for example, a non-max suppression to select amongst available choices, may be used. In this manner, for example, the encoding parameters of a typical video encoder may be optimized based on the $N_O \times W_O \times H_O$ data set, e.g., quantization varied based on the indication of an object/feature in video.

In one example, in a case where a number of instances of K×K kernels each having a corresponding dimension equal to a $N_i$ is used in processing of an $N_i \times W_i \times H_i$ dataset, the following notation may be used to indicate one of a convolution or convolution transpose, the kernel size, the stride function, and padding function for a convolution, and the number of output dimensions of a discrete convolution:

conv2d: 2D convolution, conv2dT: 2D convolution transpose,
  kK: kernel of size K for all dimensions (e.g., K×K);
  sS: stride of S for all dimensions (e.g. (S, S));
  pP: pad by P to both sides of all dimensions with value 0, (e.g., (P, P) for 2D); and
  nN number of output of channels.

It should be noted that in the example notation provided above, the operations are symmetric, i.e., square. It should be noted that in some examples, the notation may be as follows for general rectangular cases:

conv2d: 2D convolution, conv2dT: 2D convolution transpose,
  $kK_wK_h$: kernel of size $K_w$ for width dimension and $K_h$ for height dimension (e.g., $K_w \times K_h$);
  $sS_wS_h$: stride of $S_w$ for width dimension and $S_h$ for height dimension (e.g., $S_w \times S_h$);
  $pP_wP_h$: pad by $P_w$ to both sides of width dimension and $P_h$ to both sides of height dimension (e.g., $P_w \times P_h$); and
  nN number of output of channels.

It should be noted that in some examples, a combination of the above notation may be used. For example, in some examples, K, S, and $P_wP_h$ notation may be used. Further, it should be noted that in other examples, padding may be asymmetric about a spatial dimension (e.g., Pad 1 row above, 2 rows below).

Further, as described above, convolution may be performed on one-dimensional data sets (1D) or on higher dimensional data sets (e.g., 3D data sets). It should be noted that in some cases, the notation above may be generalized for convolutions of multiple dimensions as follows:

conv1d: 1D convolution, conv2d: 2D convolution, conv3d: 3D convolution
  conv1dT: 1D convolution transpose, conv2dT: 2D convolution transpose, conv3dT: 3D convolution transpose
  kK: kernel of size K for all dimensions (e.g., K for 1D, K×K for 2D, K×K×K for 3D)
  sS: stride of S for all dimensions (e.g., (S) for 1D, (S, S) for 2D, (S, S, S) for 3D)
  pP: pad by P to both sides of all dimensions with value 0 (e.g., (P) for 1D, (P, P) for 2D, (P, P, P) for 3D) nN number of output of channels The notation provided above may be used for efficiently signaling of autoencoding and autodecoding operations. For example, in the case of down-sampling a single 1024×742 RGB image to a 342×248 OFM, as described above, according to 256 instances of kernels may be described as follows:

Input data: 3×1024×742
  Operation: conv2d, k3, s3, p1, n256
  Resulting Output data: 256×342×248

Similarly, in the case of down-sampling a 60 1920×1080 monochrome pictures to a 640×360 OFM, as described above, according to 32 instances of kernels may be described as follows:

Input data: 60×1920×1080
  Operation: conv2d, k3, s3, p0.2 n32
  Resulting Output data: 32×640×360

It should be noted that there may be numerous ways to perform convolution on input data in order to represent the data as an output feature map (e.g., $1^{st}$ padding, $1^{st}$ convolution, $2^{nd}$ padding, $2^{nd}$ convolution, etc.). For example, the resulting data set 256×342×248 may be further down-sampled by 3 in the spatially dimension and by 8 in the channel dimension and as follows:

Input data: 256×342×248
  Operation: conv2d, k3, s3, p0,1, n32
  Resulting Output data: 32×114×84

In one example, according to the techniques herein, the operation of an autodecoder may be well-defined and known to an autoencoder. That is, the autoencoder knows the size of the input (e.g., the OFM) received at the decoder (e.g., 256×342×248, 32×640×360, or 32×114×84 in the examples above). This information along with the known k and s of convolution/convolution-transpose stages can be used to determine what the data set size will be at a particular location.

As described above, an example of a machine task includes object recognitions tasks. Object recognition tasks typically involve receiving an image, generating feature data corresponding to the image, analyzing the feature data, and generating inference data. Examples of typical object detection systems include, for example, systems implementing versions of YOLO, RetinaNet, and Faster R-CNN. Detailed descriptions of object detection systems, performance evaluation techniques, and performance comparisons are provided in various technical journals and the like. For example, Redmon et al., "YOLOv3: An Incremental Improvement," arXiv:1804.02767, 8 Apr. 2018, generally describes YOLOv3 and provides a comparison to other object detection systems. Wu et al., "Detectron2," at github, facebookresearch, detectron2, 2019 provides libraries and associated documentation for Detectron2 which is a Facebook Artificial intelligence (AI) Research platform for object detection, segmentation and other visual recognition tasks. It should be noted that for explanation purposes, in some cases, the techniques described herein are described with specific example object detection systems (e.g., Detectron2). However, it should be noted that the techniques herein may be generally applicable to other object detection systems.

Figure 8:
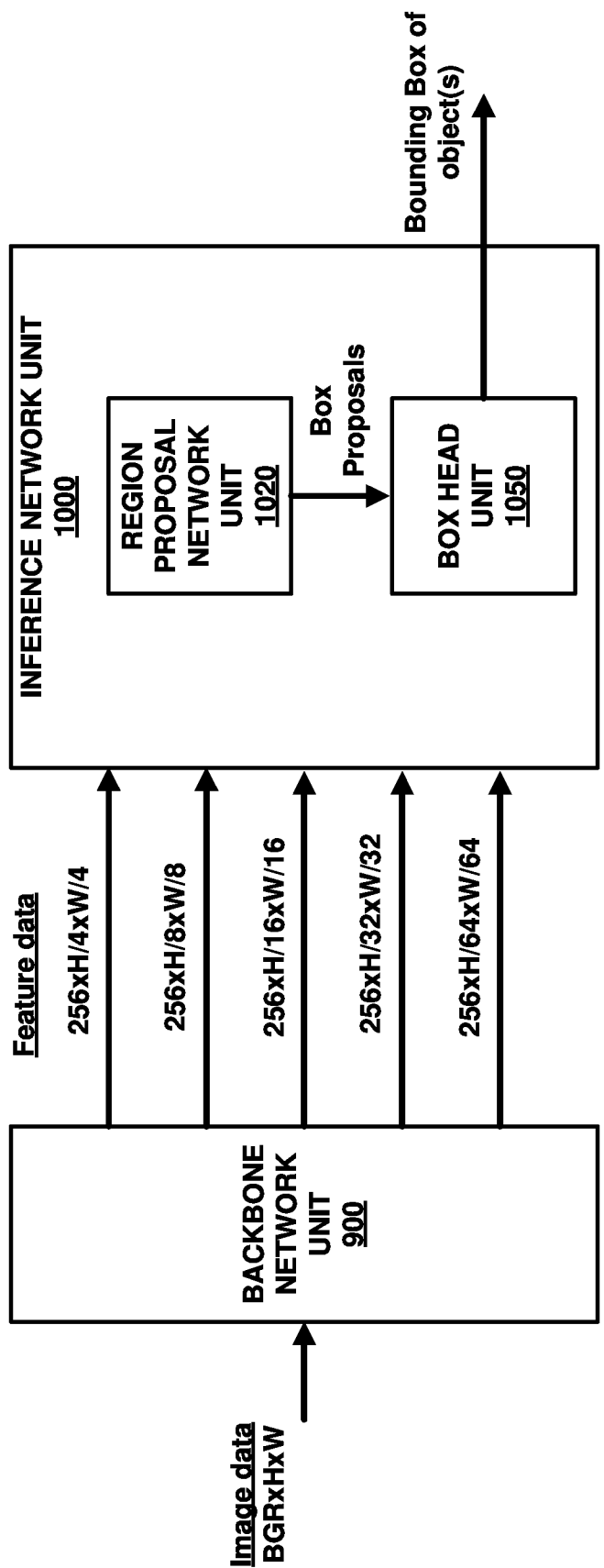
FIG. 8 is a block diagram illustrating an example of object detection network which may be utilized with one or more techniques of this disclosure.
Figure 9:
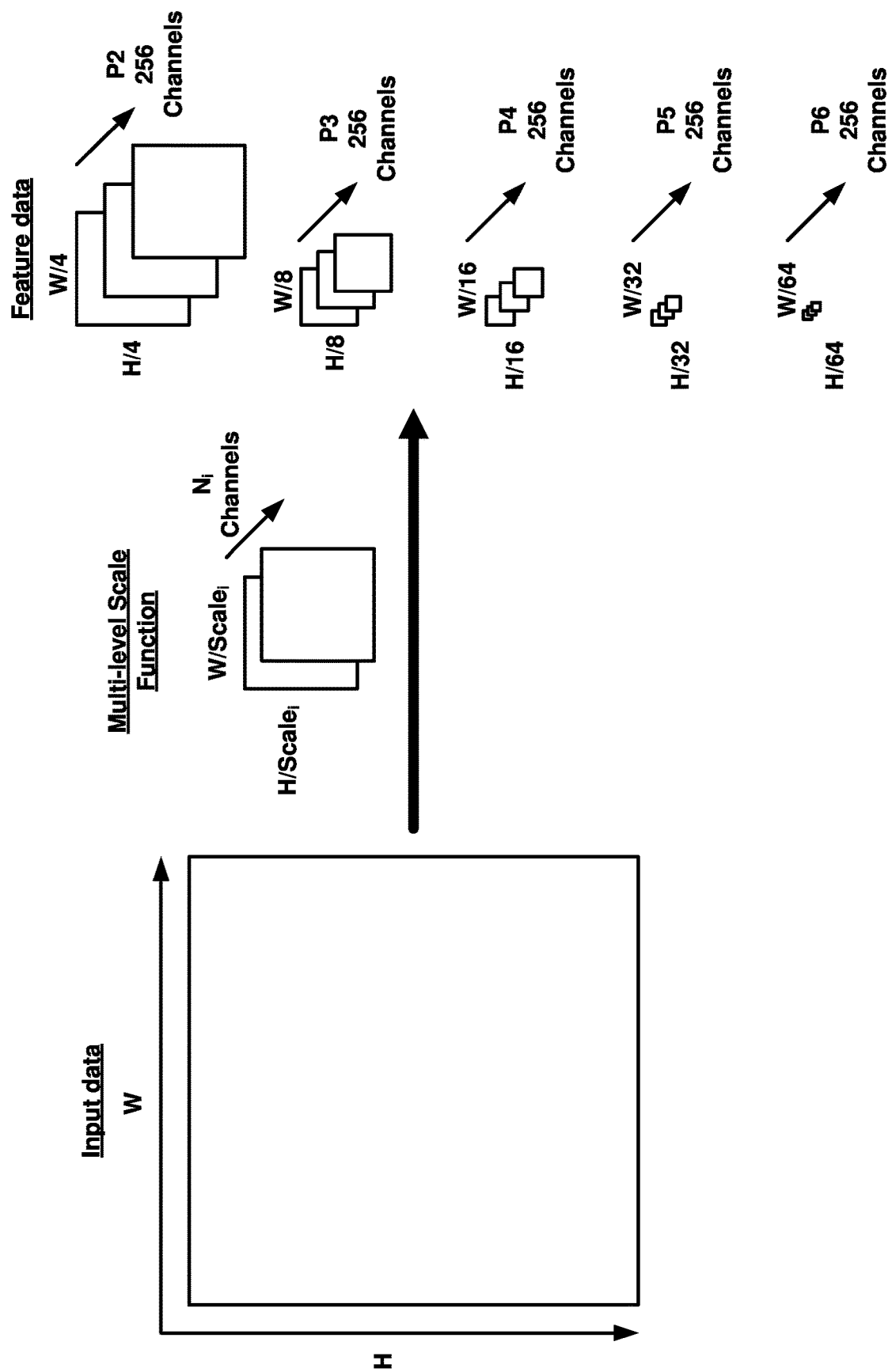
FIG. 9 is a conceptual diagram illustrating an example of generating feature data in accordance with techniques which may be utilized with one or more techniques of this disclosure.

During an MPEG Meeting in 2020, the Video Coding for Machines (VCM) Group made a decision to adopt Detectron2 as the platform for object detection and instance segmentation. FIG. 8 illustrates an example where feature data and inference data (i.e., bounding boxes) are generated for image data according to Detectron2. It should be noted that for the sake of brevity a complete detailed description of how Detectron2 generates feature data and inference data is not provided herein. The techniques described herein relate to compressing/decompressing feature data generated according to Detectron2 which may be useful for distributing operations of Detectron2 over a communications network. As illustrated in FIG. 8, Detectron2 can be described as including a backbone network unit 900 and an inference network unit 1000. In general, object detection systems include a backbone network that generates feature data and an inference network that generates inference data from the feature data. In Detectron2, a Feature Pyramid Network (FPN), Base-RCNN-FPN, extracts feature maps from an BGR input image at different scales. Detectron2 generates features maps at ¼ scale, ⅛ scale, ¹⁄₁₆ scale, ¹⁄₃₂ scale, and ¹⁄₆₄ scale and at each scale, 256 channels of data are generated. That is, as described above with respect to autoencoding, data is generated for each of 256 instances of kernels at each scale. It should be noted that in Detectron2, at each scale, one or more convolutions and operations are performed to generate feature data (e.g., 7×7 convolution with stride=2 and max pooling with stride=2). FIG. 9 is a conceptual diagram illustrating an example of generating feature data according to Detectron2. As illustrated in FIG. 9, for input data having a width, W, and a height, H, at each scale, i.e., ¼ scale, ⅛ scale, ¹⁄₁₆ scale, ¹⁄₃₂ scale and ¹⁄₆₄ scale, there are 256 channels of feature data. With respect to Dectectron2, the scales of feature data are respectively referred to as P2, P3, P4, P5, and P6. Thus, in a case where, an input image has a size of 1280×800, according to Detectron2, P2, P3, P4, P5, and P6 may have the following respective sizes: 256×320×200; 256×160×100; 256×80×50; 256×40×25; and 256×20×13. As described in further detail below, according to the techniques described herein, each of P2, P3, P4, and P5 may be compressed for distribution over a communications network. It should be noted, that as described above, the techniques herein may be generally applicable to other object detection systems. That is, types of backbone networks, other than that used in Detectron2 may generate a different number of channels (e.g., 128, 1024, etc.) at different scales (e.g., ½ and ⅛ scales) and the compression techniques herein may be utilized with such backbone networks.

Figure 10:
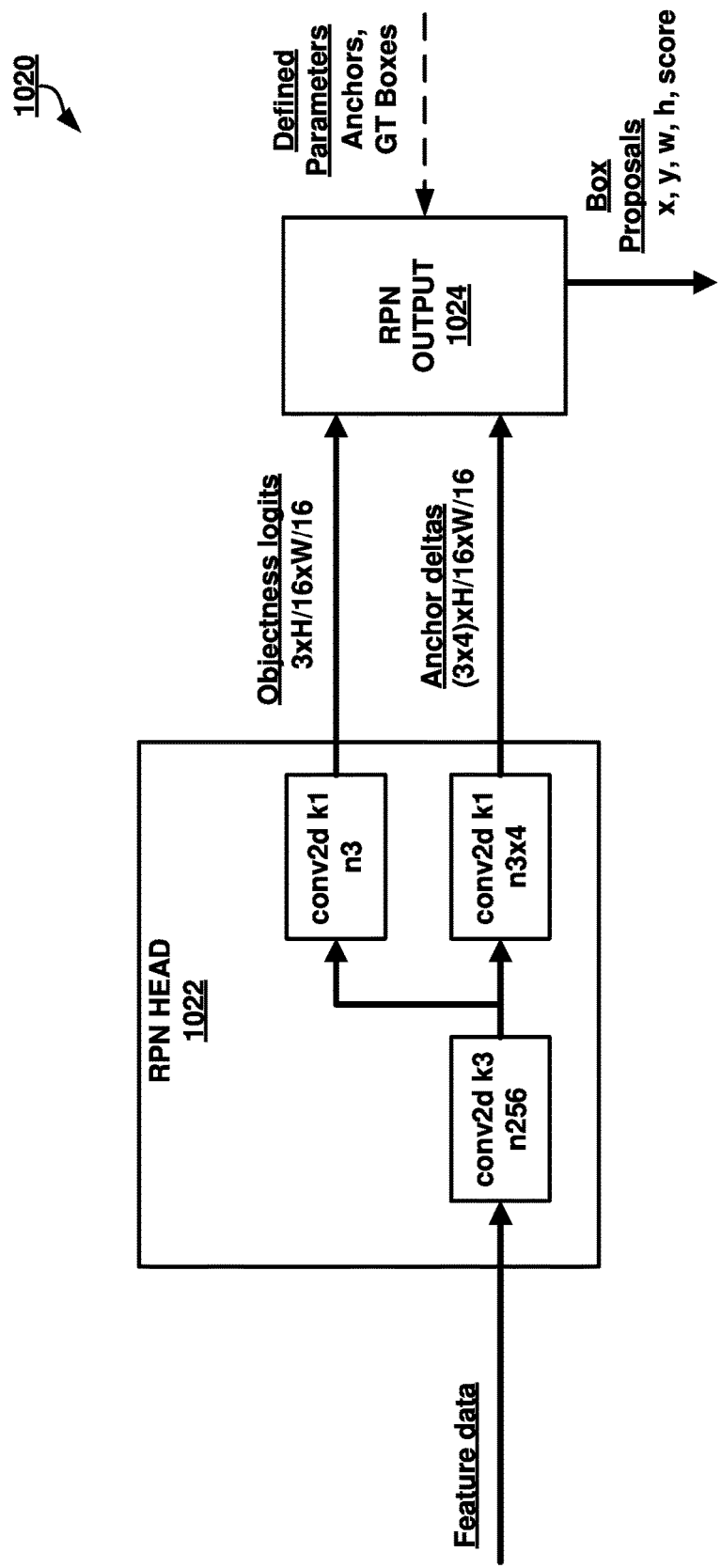
FIG. 10 is a block diagram illustrating an example of region proposal network which may be utilized with one or more techniques of this disclosure.

As described above, an inference network, (e.g, inference network unit 1000) receives feature data and generates inference data. With respect to Detectron2, and in general, in some examples, an inference network, may be described as including a region proposal network and sub-classes of ROI (regions of interest) heads, which may generally be referred to as a box head. In Detectron2, a region proposal network receives the features maps at ¼ scale, ⅛ scale, ¹⁄₁₆ scale, ¹⁄₃₂ scale, and ¹⁄₆₄ scale, each having 256 channels, as described above, and outputs 1000 box proposals (which is set as a default) with confidence scores. That is, each of the 1000 box proposals, includes an anchor coordinate, a height, a width, and a score. In general, a region proposal network in Detectron2 can be described as including a RPN head and an RPN output. FIG. 10 illustrates an example of region proposal network 1020 including RPN head 1022 and RPN output 1024. In Detectron2, for each feature scale, an RPN head generates objectness logits and anchor deltas. Objectness logits are a probability map of object existence and anchor deltas are a relative box shape and position to anchors. As illustrated in FIG. 10, an initial conv2d k3 n256 operation is performed on a feature map. To generate objectness logits a conv2d k1 n3 is performed after the initial conv2d k3 n256 operation. To generate anchor deltas a conv2d k1 n3×4 is performed data after the initial conv2d k3 n256 operation. As illustrated in FIG. 10, RPN output 1024 receives objectness logits and defined parameters including e.g., anchors and ground truth boxes, and generates box proposals. In Detectron2, the generation of box proposals includes anchor generation, ground truth preparation, loss calculation, and proposal selection. Essentially, in Detectron2, the output feature maps of the objectness logits and anchor deltas are associated with ground truth boxes to generate predicted boxes which are scored and the top 1,000 scored boxes are selected as output.

Figure 11:
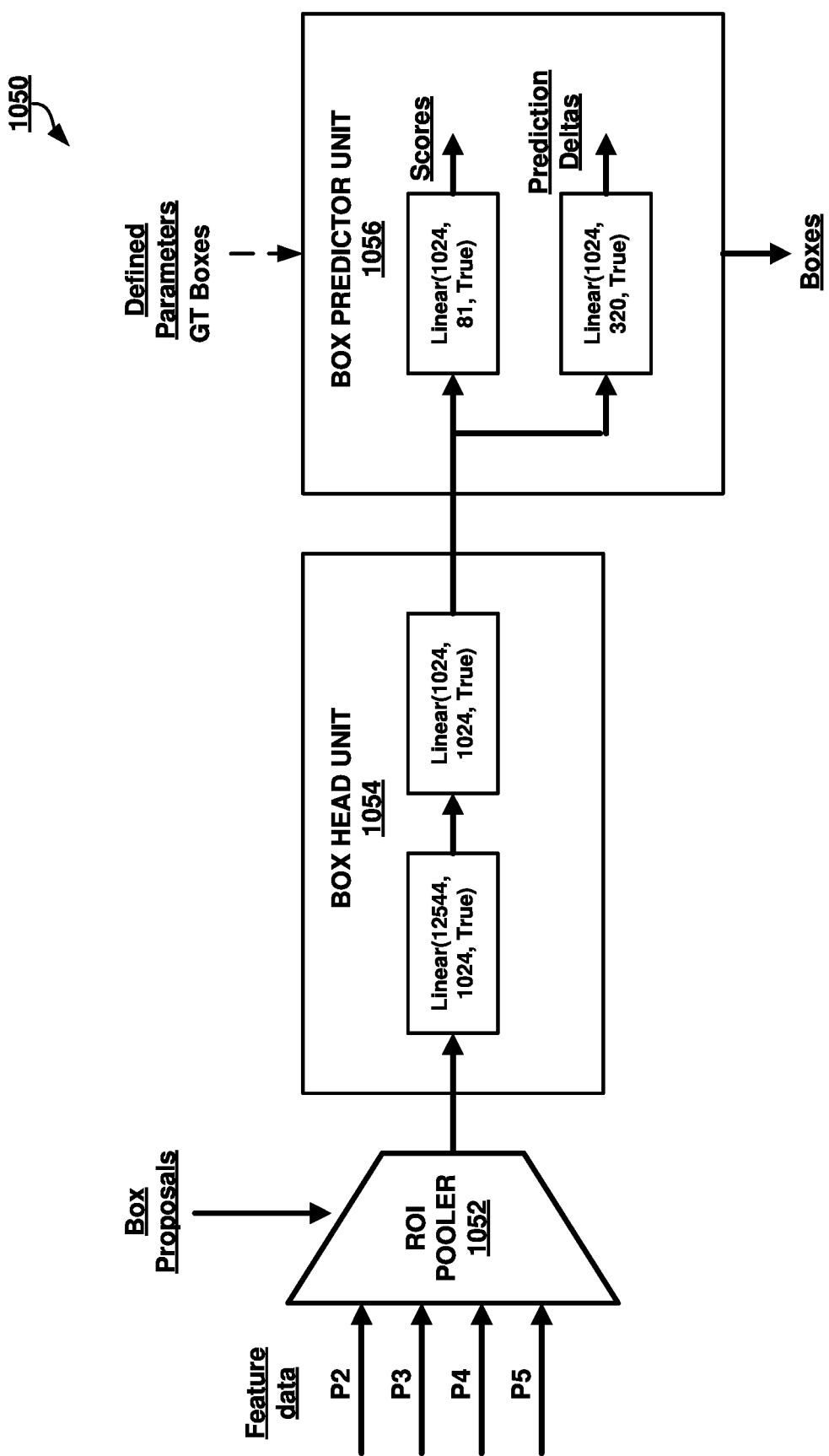
FIG. 11 is a block diagram illustrating an example of box head which may be utilized with one or more techniques of this disclosure.

As described above, an inference network may include a box head unit. In general, a box head in Detectron2 can be described as including a ROI pooler, a box head, and a box predictor. FIG. 11 illustrates an example of box head unit 1050 including ROI Pooler 1052, box head unit 1054, and box predictor unit 1056. In Detectron2, an ROI pooler pools the rectangular regions of the feature maps that are specified by the box proposals. Essentially, an ROI pooler, generates a tensor which is the collection of cropped instance features which include balanced foreground and background ROIs. In Detectron2, this tensor may have a size of [N×batch size, 256, 7, 7], where the ROI size is 7×7. In Detectron2, a box head may be a FastRCNNConvFCHead and a box predictor may be a FastRCNNOutputLayers. It should be noted that an ROI may generate tensors of other sizes. It should be noted although not shown in FIG. 20, prior to input into box head unit 1054, the tensor generated from ROI pooler is flattened to a 256×7×7=12,544 tensor.

As illustrated in FIG. 11, box head unit 1054 performs two Linear( ) operations. A Linear( ) operation is specified as follows:

Linear(in_features_count, out_features_count, bias)

Applies a linear transformation to the incoming data:

$$y = xA^T + b$$

Parameters
   in_features—size of each input sample
   out_features—size of each output sample
   bias—If set to False, the layer will not learn an additive
      bias. Default: True
Shape
   Input: $(N, *, H_{in})$ where * means any number of additional
      dimensions and Hin=in_features
   Output:: $(N, *, H_{out})$ where all but the last dimension are
      the same shape as the input and Hout=out_features,
Variables
   ~Linear.weight—the learnable weights of the module of
      shape (out_features,in_features). The values are initialized from U(~sqrt{k}, sqrt{k}), Where k=1/in_features, and sqrt{ } is a square root operation
   ~Linear.bias—the learnable bias of the module of shape
      (out_features). If bias is True, the values are initialized
      from U(~sqrt{k}, sqrt{k}), where k=1/in_features Box head unit 1054 classifies an object within an ROI and fine-tunes the box position and shape. Box predictor unit 1056 generates classification scores and bounding box predictors. The classification scores and bounding box predictors may be used to output bounding boxes. Typically, in Detectron2, a maximum of 100 bounding boxes are filtered out using non-maximum suppression (NMS). It should be noted the maximum number of bounding boxes is configurable and it may be useful to change the number depending on a particular application.

As described above, in Detectron2, inference data includes bounding boxes. In some applications, it may be useful to have so-called instance segmentation information, which may, for example, provide a per-pixel classification for a bounding box. That is, instance segmentation information may indicate whether a pixel within a bounding box constitutes part of the object. Further, instance segmentation information may, for example, include a binary mask for a ROI. As described above, with respect to the example in FIG. 11, an ROI pooler essentially generates tensors which are the collection of cropped instance features and these tensors may be input a FastRCNNConvFCHead box head.

Figure 12:
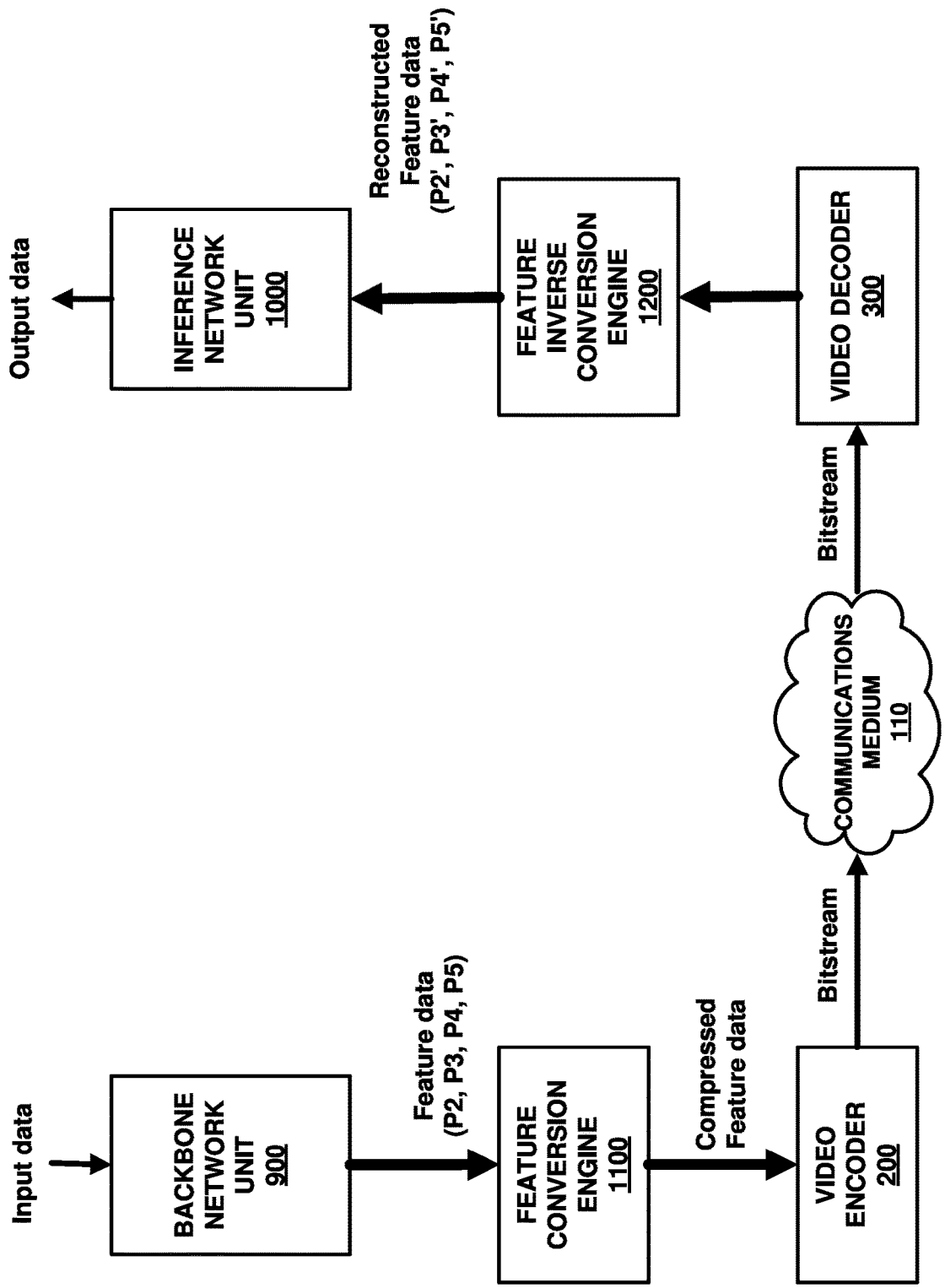
FIG. 12 is a block diagram illustrating an example of a coding system that may code a multi-dimensional data set in accordance with one or more techniques of this disclosure.

As described above, it is useful for allowing machine tasks to be distributed across a communication network. That is, referring to FIG. 12, each of feature extraction network 900 and inference data generation network 1000 may distributed across communications medium 110, and thus, in some examples located at distinct physical locations. As described above, the VCM Group made a decision to adopt Detectron2 as the platform for object detection and instance segmentation. Dong-Ha Kim, et al. "[VCM Track 1] Compression of FPN Multi-Scale Features for Object Detection Using VVC", m59562, ISO/IEC JTC 1/SC 29/WG 2, April 2022 (hereinafter Kim1) and Dong-Ha Kim, et al. "[VCM-Track1] Performance of the Enhanced MSFC with Bottom-Up MSFF", m60197, July 2022 (hereinafter Kim2, Kim1 and Kim2 are collectively referred to herein as Kim) describe processing pipelines where Detectron2 P5, P4, P3, and P2 multi-scale feature data is converted to a single C×H/32×W/32 tensor, where C equals, 256, 192, 144, or 64 channels with a so-called Multi-Scale Feature Fusion (MSFF) module and the single tensor is encoded into a bitstream using VVC. The bitstream is decoded using VVC and each of P5, P4, P3, and P2 are recovered using a so-called Multi-Scale Feature Reconstruction (MSFR) module. FIG. 12 illustrates a general example of the system for compressing and recovering multi-scale feature data. That is, the MSFF modules described in Kim1 and Kim2 may be examples of a feature conversion engine 1100 and the MSFR modules described in Kim1 and Kim2 may be examples of a feature inverse conversion engine 1200. Further, it should be noted that the system illustrated in FIG. 12 may correspond with the systems described in Kim1, Kim2, and also further incorporate the techniques described herein. For example, as described in further detail below, according to the techniques herein a feature conversion engine 1100 and a feature inverse conversion engine 1200 may be optimized compared to the MSFF and MSFR modules described in Kim1 and Kim2.

Figure 13:
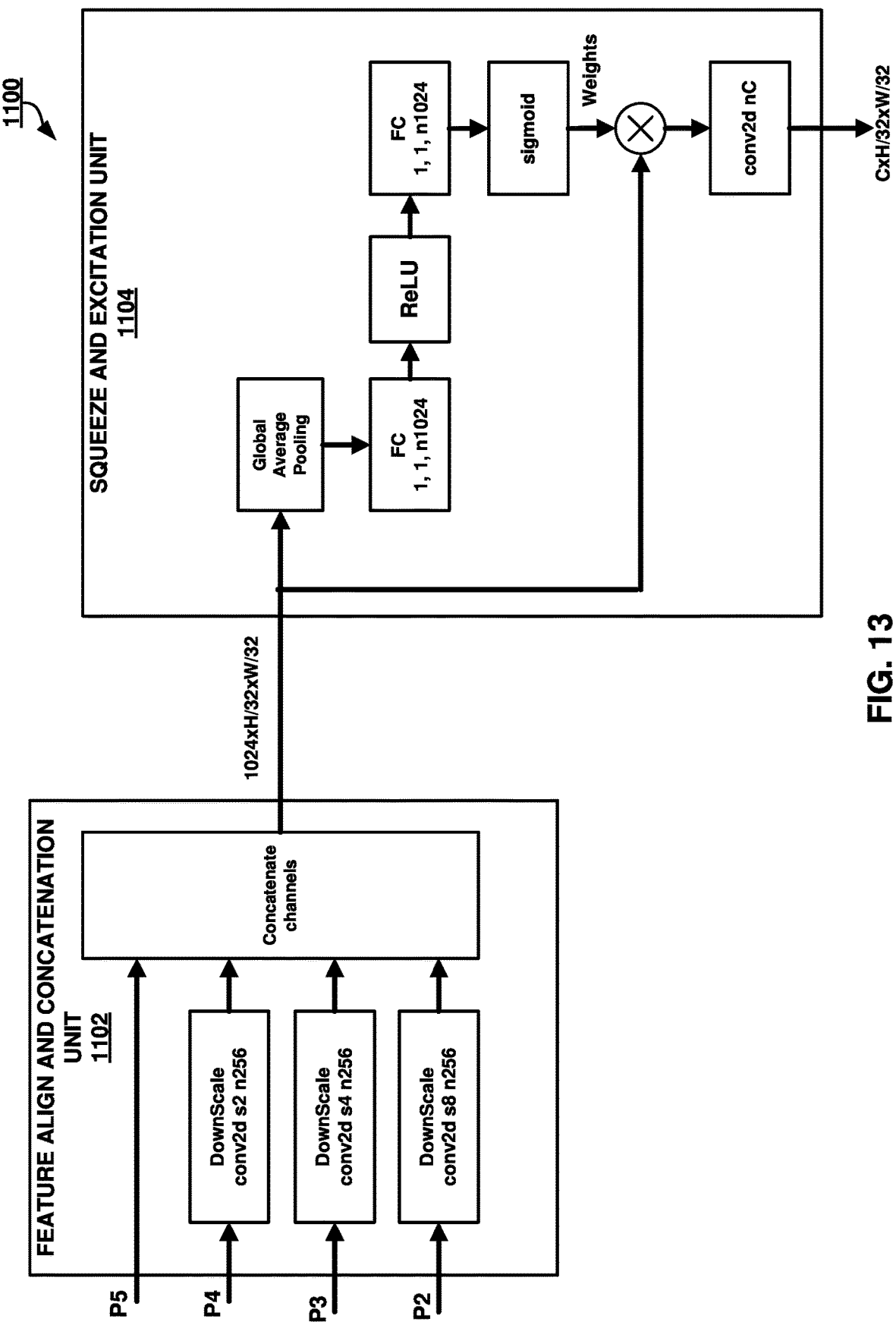
FIG. 13 is a block diagram illustrating an example of components of a feature conversion engine that may code a multi-dimensional data set in accordance with one or more techniques of this disclosure.

FIG. 13 is a block diagram illustrating an example of a feature conversion engine 1100. The example feature conversion engine 1100 may generally correspond to the MSFF module described in Kim2. As illustrated in FIG. 13, feature conversion engine 1100 receives P5, P4, P3, and P2 tensors (e.g., generated according to Detectron2) a single C×H/32×W/32 tensor. As illustrated in FIG. 13, feature conversion engine 1100 includes feature align and concatenation unit 1102 and squeeze and excitation unit 1104. As illustrated in FIG. 13, feature align and concatenation unit 1102 down samples each of the respective 256 channels of P4, P3, and P2 using respective 2D convolution operations, such that each has the same spatial dimensions as P5. For example, as described above, in a case where, an input image has a size of 1280×800, according to Detectron2, P2, P3, P4, and P5 may have the following respective sizes: 256×320×200; 256×160×100; 256×80×50; and 256×40×25. In this case, feature align and concatenation unit 1102 down samples each of P2, P3, and P4 to 256×40×25. As further illustrated in FIG. 13, feature align and concatenation unit 1102 concatenations P5 and each of down sampled (or resized) P2, P3, and P4 about the channel dimension to generated 1024 channels at the size of P5.

As further illustrated in FIG. 13, the concatenated feature tensor is input into squeeze and excitation unit 1104. It should be noted that for the sake of brevity a complete detailed description of how squeeze and excitation networks are not provided herein. However, reference is made to Hu et al., "Squeeze-and-Excitation Networks," arXiv: 1709.01507, 16 May 2019, which describes squeeze and excitation networks in detail. In general, as illustrated in FIG. 13, squeeze and excitation unit 1104 reweighs the concatenated feature tensor and performs channel reduction on the reweighed concatenated feature tensor, such that C channels at the spatial resolution of P5 are output. As illustrated in FIG. 13, at the upper branch of squeeze and excitation unit 1104 respective weights are generated. The concatenated feature tensor is multiplied by a respective weight to reweigh concatenated feature tensor. The global average pooling operation essentially averages each channel to a single and the FC 1, 1, n1024 operations are fully connected layers. Further, in FIG. 13, ReLU refers to an operation where ReLU(x)=max (0, x). That is, if an output at the second FC stage is negative, it is set to 0. Further, sigmoid corresponds to the following operation:

$$\text{sigmoid}(x) = \sigma(x) = \frac{1}{1+e^{-x}}$$

Thus, the upper branch of squeeze and excitation unit 1104 outputs a weight value ranging from 0 to 1 for each channel. After the respective weights are applied, a final convolution operation is used to generate the number of channels to be output, C channels. Kim1 describes where C is equal to 256 and where the output of MSFF module is a 256-channel, W/32×H/32 floating data type tensor. Kim1 further describes where C may be equal to 192 or 144 and Kim2 further described where C may be equal to 64.

Figure 14:
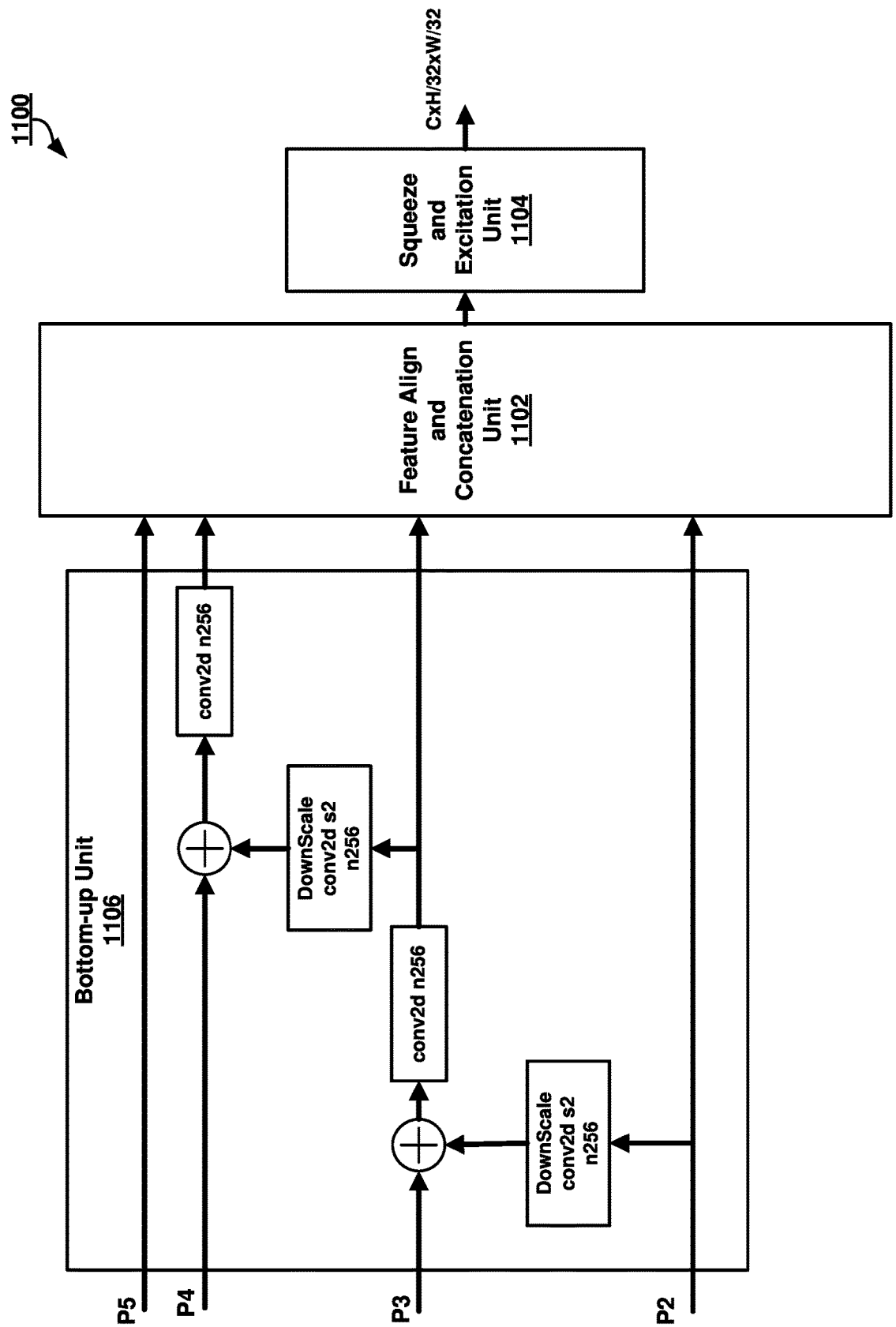
FIG. 14 is a block diagram illustrating an example of components of a feature conversion engine that may code a multi-dimensional data set in accordance with one or more techniques of this disclosure.

It should be noted that Kim2 describes where a so-called bottom-up module may be used to preprocess Detectron2 multi-scale feature data prior to input to feature align and concatenation unit 1102. FIG. 14 illustrates an example of a feature conversion engine 1100 including bottom-up unit 1106. As illustrated in FIGS. 14, P2 and P5 are directly input into feature align and concatenation unit 1102. Additionally, P2 is down scaled using a convolution layer and added to P3. The result is passes through a convolutional layer which fine-tunes the summed feature before it is provided to feature align and concatenation unit 1102. Similarly, the fine-tuned feature data corresponding to P3 is down scaled and added to P4, the result of which passes through a convolutional layer which fine-tunes the features data before it is provided to feature align and concatenation unit 1102.

Figure 15:
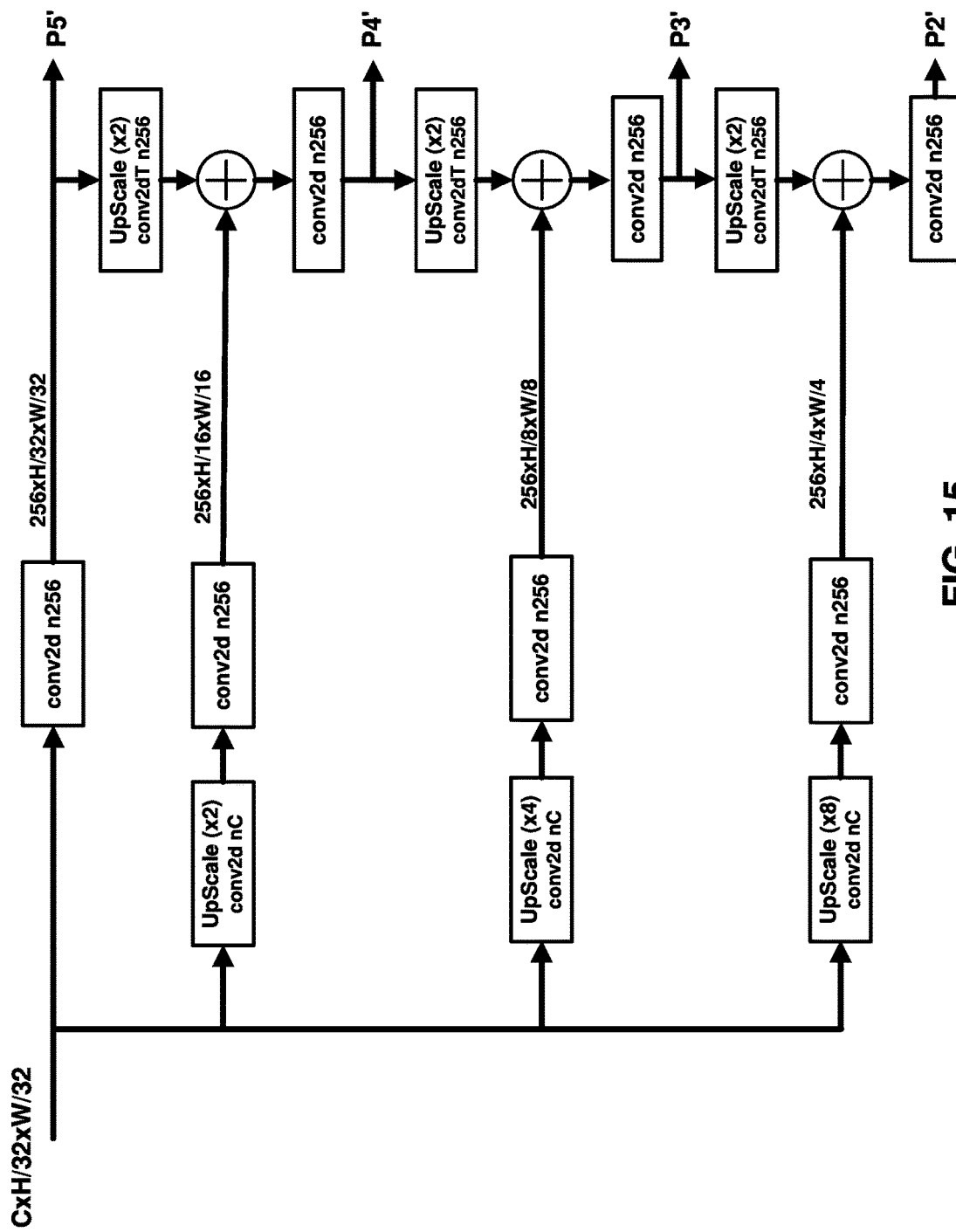
FIG. 15 is a block diagram illustrating an example of components of an inverse feature conversion engine that may code a multi-dimensional data set in accordance with one or more techniques of this disclosure.

Referring again to FIG. 12 and as described above, the MSFR modules described in Kim1 and Kim2 may be examples of a feature inverse conversion engine 1200. FIG. 15 is a block diagram illustrating an example of a feature inverse conversion engine 1200. The example feature conversion engine 1100 may generally correspond to the MSFR module described in Kim1 and Kim2. The input to feature inverse conversion engine 1200 corresponds to the output of feature conversion engine 1100. As illustrated in FIG. 15, the input to feature inverse conversion engine 1200 has C channels and as described above, Kim describes where C may be equal to one or 256, 192, 144, or 64. Recovered P5 feature data, P5', is generated by restoring C to 256. As illustrated in FIG. 15, For each of P4, P3, and P2, the input is spatially upscaled to the appropriate size using a 2D convolution and C is restored to 256 using a 2D convolution. Further, as illustrated in FIG. 15, recovered P4 feature data, P4', is generated by adding upscaled P5' to the spatial and channel restored data corresponding to P4. As illustrated in FIG. 15, P5' is upscaled using a 2D convolution-transpose operation. Similar, recovered P3 feature data, P3', is generated by adding upscaled P4' to the spatial and channel restored data corresponding to P3 and recovered P2 feature data, P2', is generated by adding upscaled P3' to the spatial and channel restored data corresponding to P2. It should be noted that with respect to P6, although not illustrated in FIG. 12, P6' is generated from P5' using a max pooling layer.

Figure 16:
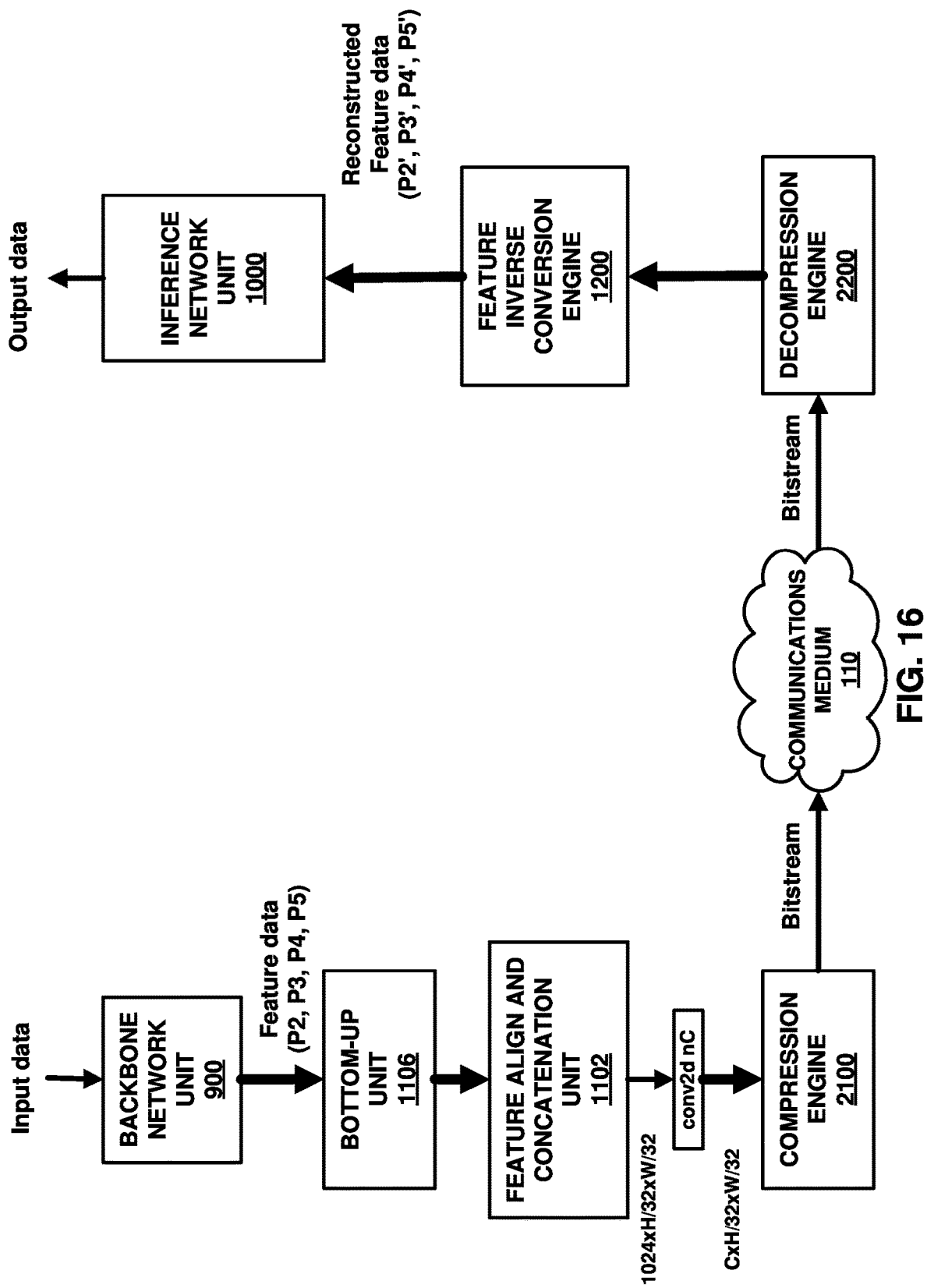
FIG. 16 is a block diagram illustrating an example of a coding system that may code a multi-dimensional data set according to one or more techniques of this disclosure.

As described above, Kim utilizes a squeeze and excitation network and utilizes VVC for generating a bitstream. Such an approach may be less the ideal. According to the techniques herein, a feature conversion engine 1100 that does not utilize a squeeze and excitation network and a compression engine other than VVC may be utilized for allowing machine tasks to be distributed across a communication network. FIG. 16 is an example of a coding system that may encode a multi-dimensional data set in accordance with one or more techniques of this disclosure. As illustrated in FIG. 16, the system includes backbone network unit 900, bottom-up unit 1106, feature align and concatenation unit 1102, feature inverse conversion engine 1200, inference data generation network 1000 and communications medium 110. Each of backbone network 900, bottom-up unit 1106, feature align and concatenation unit 1102, feature inverse conversion engine 1200, inference data generation network unit 1000 and communications medium 110 may include corresponding examples described above. Additionally, as illustrated in FIG. 16, the system includes compression engine 2100 and decompression engine 2200. Compression engine 2100 may be configured to compress feature data according to one or more of the techniques described herein and decompression engine 2200 may be configured perform reciprocal operations to reconstruct the feature data. It should be noted that as described above, feature align and concatenation unit 1102 may output a single 1024×H/32× W/32 feature tensor. In the example, illustrated in FIG. 16, this feature tensor may be reduced to C channels prior to input into compression engine 2100.

Figure 17:
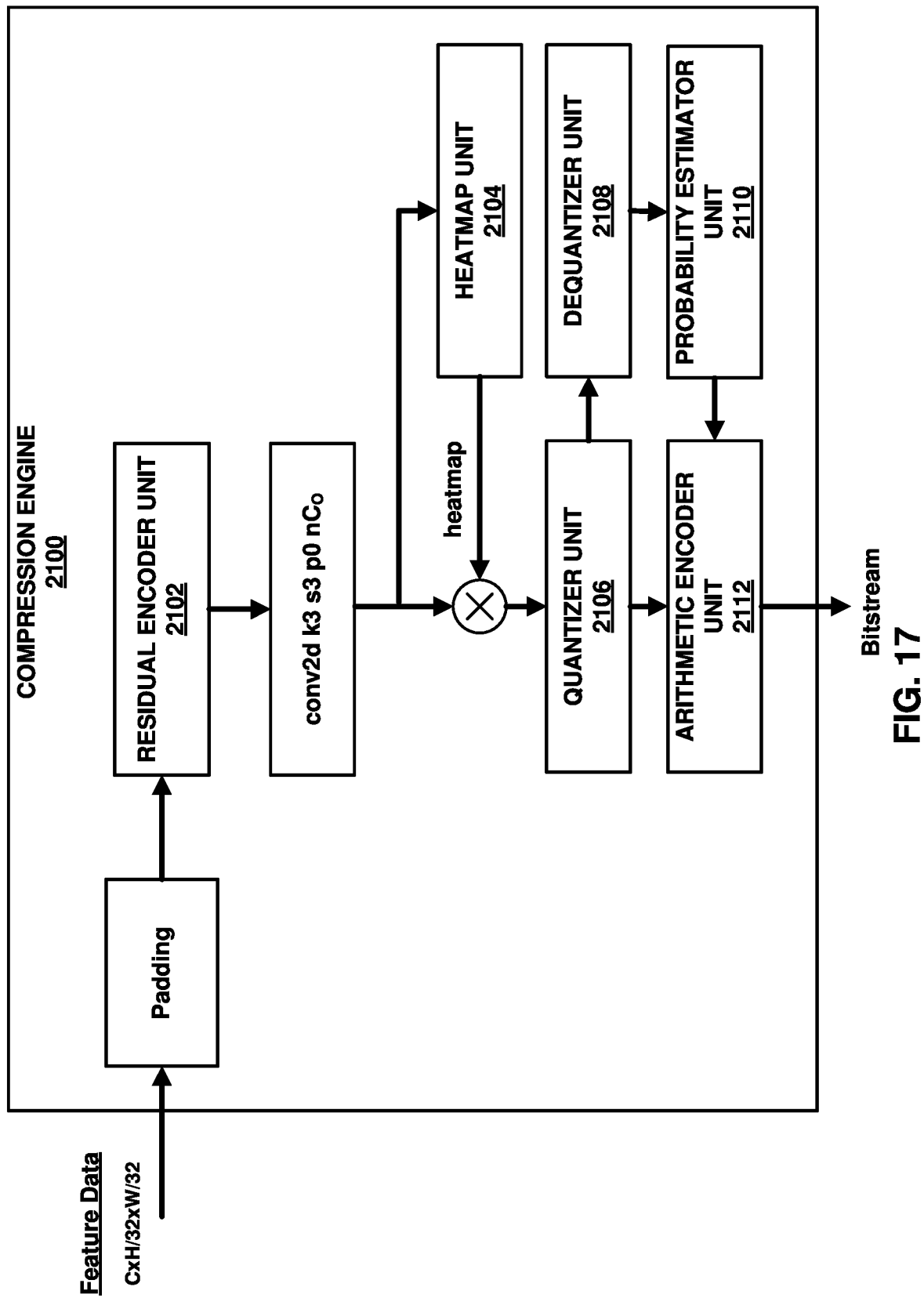
FIG. 17 is a block diagram illustrating an example of a compression engine that may be configured to encode a multi-dimensional data set according to one or more techniques of this disclosure.

FIG. 17 illustrates an example of compression engine 2100. As illustrated in FIG. 17, compression engine 2100 includes residual encoder unit 2102, heatmap unit 2104, quantizer unit 2106, dequantizer unit 2108, probability estimator unit 2110, and arithmetic encoder unit 2112. As illustrated in the example of FIG. 17, compression engine 2100 receives feature data, for example, C×H/32×W/32 feature data, and essentially generates a bitstream that compresses the input feature data by removing redundancies using residual encoding, spatially down sampling the feature data (e.g., by a factor of 3, 40×25 to 14×9), and reducing the channel count (e.g., by a factor of 4, 256 to 64). It should also be noted that in other examples input tensors having other sizes may be compressed according to the techniques herein. Further, it should be noted that compression engine 2100 may be configured to achieve a desired bit-rate. That is, for example, the factors for spatial down sampling and/or channel may be set in order to achieve a desired bit-rate.

Figure 18:
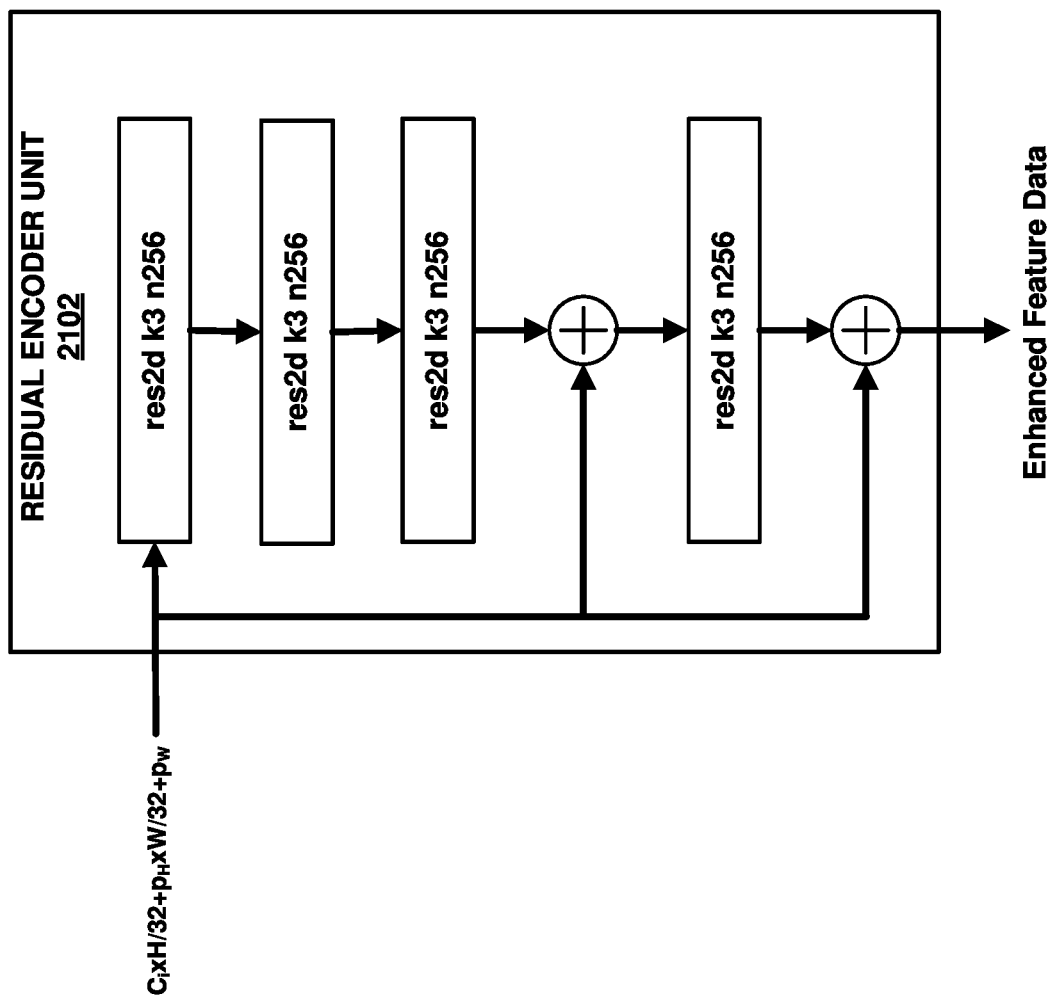
FIG. 18 is an example of a residual encoder unit in accordance with one or more techniques of this disclosure.
Figure 19:
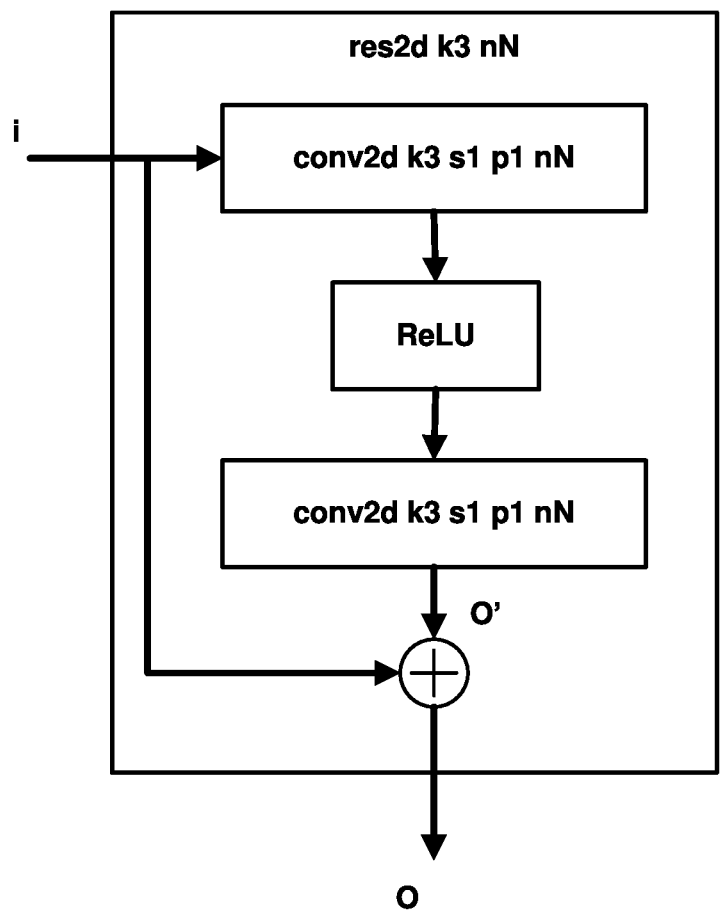
FIG. 19 is a block diagram illustrating an example of a residual block in accordance with one or more techniques of this disclosure.
Figure 20:
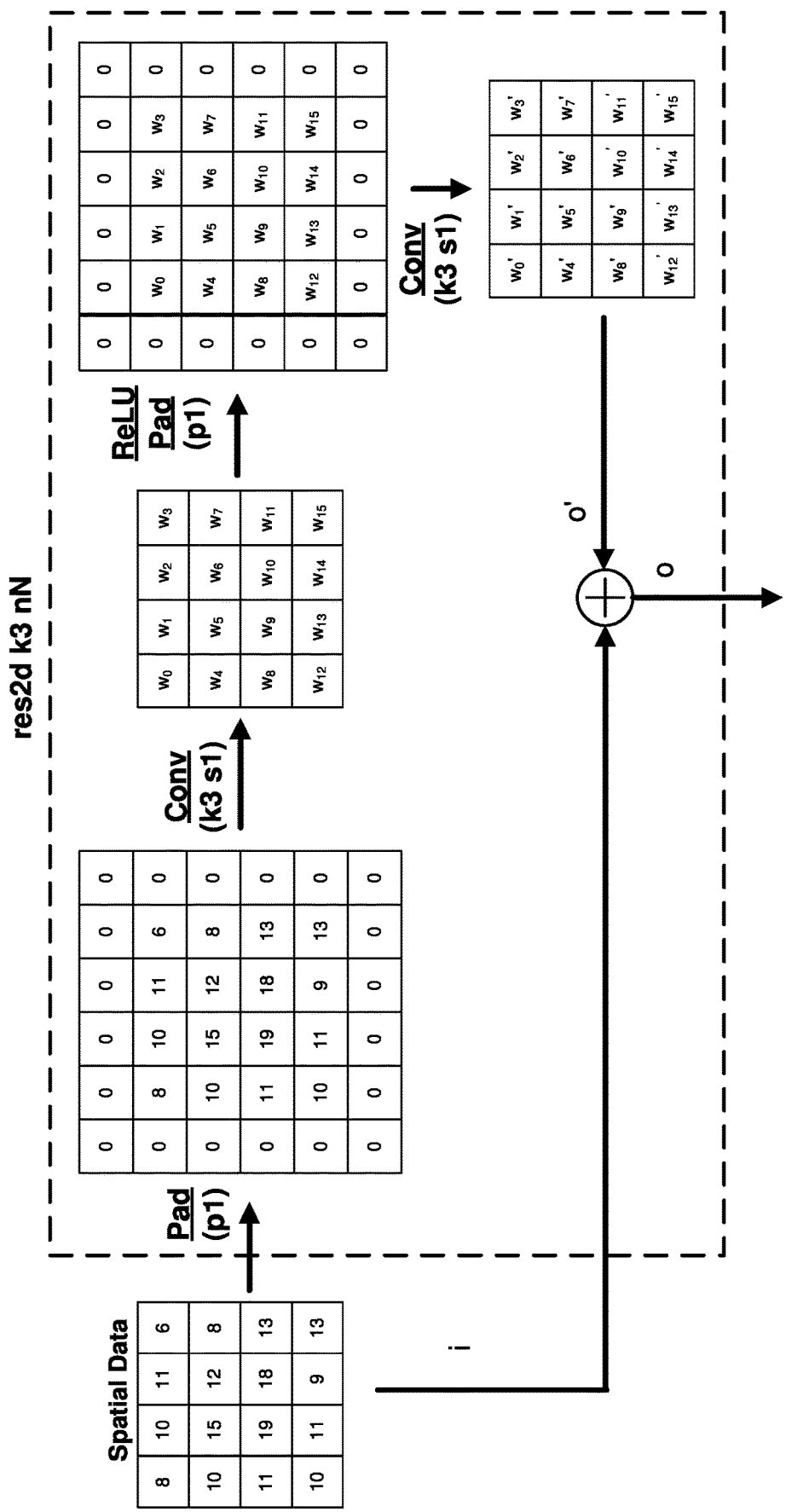
FIG. 20 is a conceptual example of a residual block in accordance with one or more techniques of this disclosure.

FIG. 18 is an example of a residual block unit in accordance with one or more techniques of this disclosure. It should be noted that as illustrated in FIG. 17, received feature data is illustrated as being padded. Padding is utilized such that each of H and W are integer multiples of a corresponding down sampling factor. For example, for a down sampling factor of 3, a 256×40×25 input tensor may be padded to 256×42×27. As illustrated in FIG. 18, a sequence of res2d k3 n256 operations and summations are performed resulting in a refinement value being added to the input. That is, as illustrated in FIG. 18, the operation of residual encoder unit 2102 may be described as enhancing or removing redundancies from received feature data. FIG. 19 illustrates a res2d k3 nN operation that may be used according to the techniques herein. As illustrated in FIG. 19, for an N channel input a refinement O' is generated using subsequent convolutions and a ReLU operation and the refinement O' is added to the input. FIG. 20 illustrates a conceptual example where for input data, i, a res2d k3 nN operation provides output data, o, which is generated by adding an intermediate output, o', to the input data i. It should be noted that in the example illustrated in FIG. 20, $w_i$ and $w_i'$ represent the weighted averages at the output of the respective convolution stages. Referring again to the example illustrated in FIG. 18, the sequence of res2d k3 n256 operations and summations essentially operate to enhance edges and features. That is, as described below, since a subsequent down sampling, about the H and W dimensions, occurs and a subsequent channel reduction occurs, it is desirable that features and/or edges survive these operations. In this case, the sequence of res2d k3 n256 operations and summations in residual encoder unit 2102 may sharpen the features/edges, for example, for purposes of object tracking.

Referring again to FIG. 17, a conv2d k3 s3 p0 $nC_o$ operation is performed on the enhanced feature data generated by residual encoder unit 2102. The conv2d k3 s3 p0 $nC_o$ operation down samples the enhanced feature data about the spatial and channel dimension (i.e., to $C_o$). For example, in the example illustrated in FIG. 17, a 256×42×27 enhanced feature data tensor may be reduced to a 64×14×9 tensor. It should be noted that in other examples, other spatially down sampling factors may be implemented, for example, by using a 2D convolution with a stride one, two, or three, etc. The target spatial down sampling factor may be determined based on a target bit-rate rate and/or a target bits per pixel. Similarly, the value of $C_o$ may be determined according to a target bit-rate rate.

Figure 21:
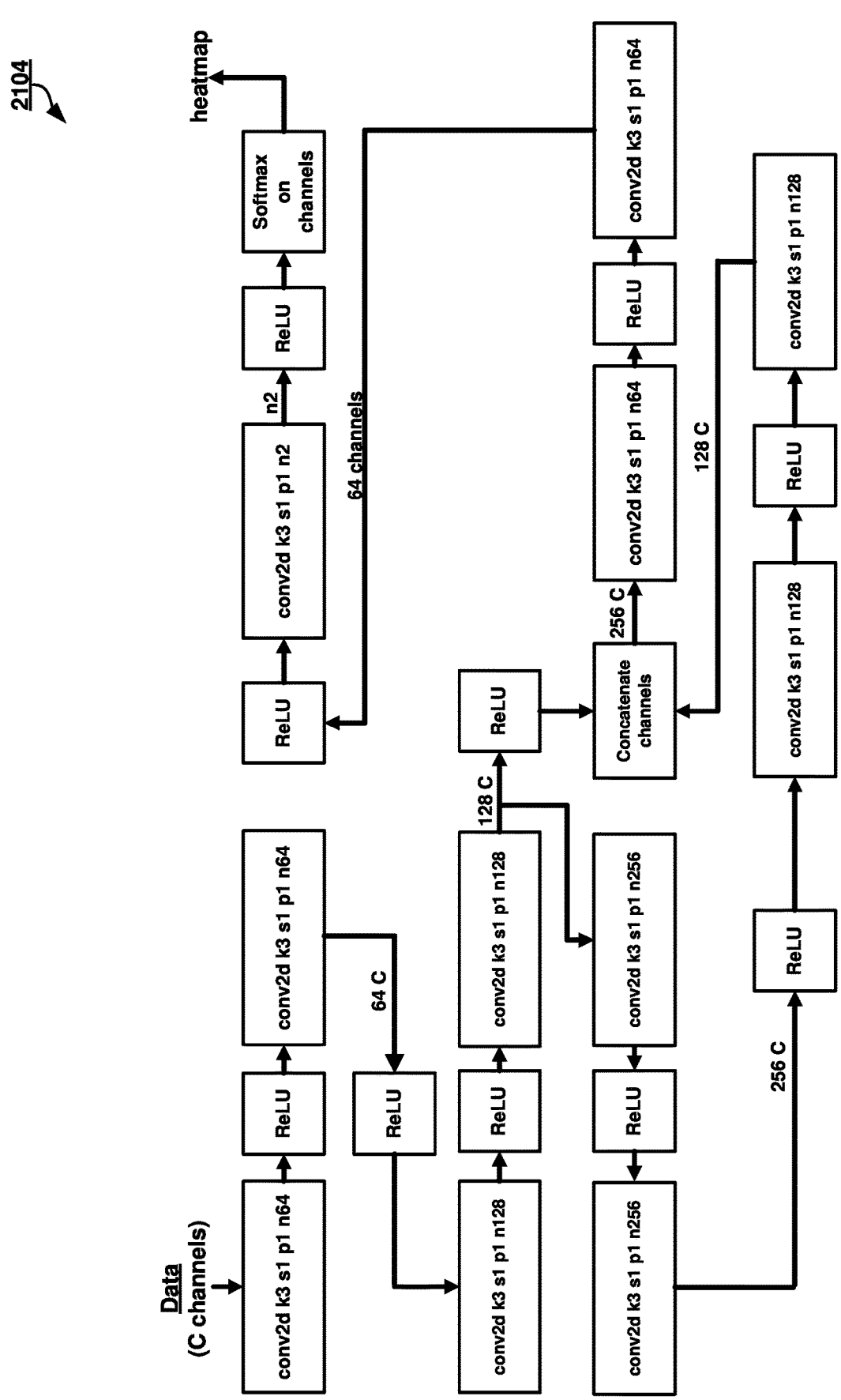
FIG. 21 is a block diagram illustrating an example of a heatmap unit in accordance with one or more techniques of this disclosure.

As illustrated in FIG. 17, the result of the conv2d operation is then multiplied by a heatmap prior to quantization by quantizer unit 2106. As illustrated in FIG. 17, heatmap unit 2104 receives the result of the conv2d operation and generates a heat map. There may be numerous ways in which heatmap unit 2104 may be configured to generate a heatmap. FIG. 21 illustrates an example of a heatmap unit. The example heatmap unit in FIG. 21 outputs an array of scaling factors to be applied at each spatial location. In the example of FIG. 21, the scaling factors are identical for each channel. Referring to FIG. 21, it should be noted that the Softmax on channels block illustrated in FIG. 21, represents an activation function that takes vectors of real numbers as inputs, and normalizes them into a probability distribution proportional to the exponentials of the input numbers. When Softmax is applied, each element will be in the range of 0 to 1, and the elements will add up to 1. It should be noted that Softmax may be referred to as a normalized exponential function. Thus, the example heatmap unit in FIG. 21 provides a weight value from 0 to 1 (non-inclusive), which when multiplied by the input to heatmap unit 2104 effectively suppresses data without impacting subsequent machine task(s) and enhances data for machine task(s). That is, the heatmap can identify spatial locations where a signal can be suppressed safely without impacting machine task(s) under consideration. For example, data at a border of a picture may be suppressed. The suppression of a signal can lead to lower bit consumption. The heatmap can also increase the magnitude of signal at certain spatial locations such that it is beneficial to machine task(s) e.g., object detection. Further, with respect to FIG. 21, it should be noted that channel size, C, is increased/decreased in multiples of 2. Further, the final convolution layer of the heatmap unit outputs two channels which are converted to a PMF (probability mass function) using the SoftMax operation. In the example of FIG. 17, the first channel is used for scaling the enhanced feature data, and the second channel is discarded.

Referring again to FIG. 17, the scaled enhanced feature data is input into quantizer unit 2106. In one example, according to the techniques herein, quantizer unit 2106 may be configured to quantize an input tensor based on techniques described in Mentzer et al., "Conditional probability models for deep image compression," arXiv: 1801.042604v4, June 2019 (hereinafter Mentzer). In one example, quantizer unit 2106 may utilize 6 quantization bins. Further, quantizer unit 2106 may utilize two quantizers in cases where the channel count exceeds a threshold.

Referring to FIG. 17, the output of quantizer unit 2110 is input into arithmetic encoder unit 2112. As illustrated in FIG. 17, arithmetic encoder unit 2112 also receives input from probability estimator unit 2110. Probability estimator unit 2110 determines the Probability Mass Function (PMF) for quantization indices at each location within a tensor. During the determination, subset of symbols (quantization indices and therefore dequantized values) that have been decoded in the past may be used to determine the PMF for current location. That is, as illustrated in FIG. 17, output of dequantizer unit 2108 (i.e., decoded past symbols) may be input into probability estimator unit 2110. As described above, a dequantizer unit performs reciprocal operations to a quantizer unit. Symbols are typically coded using arithmetic coder that make use of the corresponding PMF when coding a symbol. That is, in one example, according to the techniques herein, an arithmetic encoder unit 2112 may use an arithmetic coder that makes use of the corresponding PMF when coding a symbol. In one example, probability estimator unit 2110 may be based on a conditional probability model described in Mentzer. In one example, according to the techniques herein, probability estimator unit 2110 may extend the conditional probability model described in Mentzer by using two probability estimators when encoding more than a certain threshold of channels. It should be noted that as described above, entropy coding is a lossless process. That is, an entropy encoder and entropy decoder are synchronized so that the decoder reproduces the same sequence of symbols (e.g., quantization indices) that were coded by the encoder. Thus, as illustrated in FIG. 17 compressed feature data (i.e., spatially reduced, channels reduced, quantized and entropy coded) may be transmitted in a bitstream.

Figure 22:
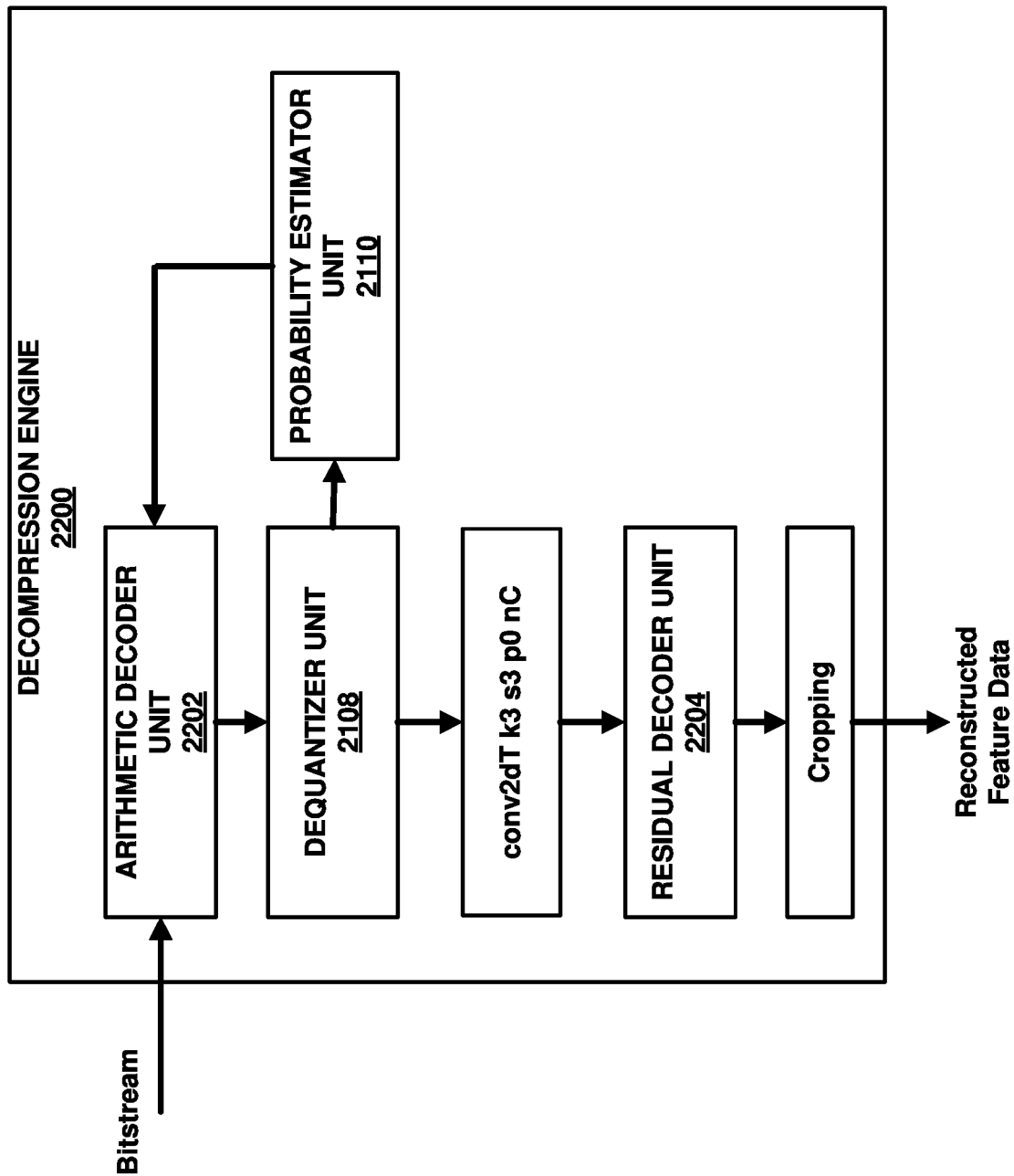
FIG. 22 is a block diagram illustrating an example of a decompression engine in accordance with one or more techniques of this disclosure.

As described above, a decompression engine may be configured to perform reciprocal operations to a compression engine to generate reconstructed feature data. FIG. 22 illustrates an example of a decompression engine configured to generate reconstructed feature data according to the techniques herein. Decompression engine 2200 is configured to perform reciprocal operations to compression engine 2100. As illustrated in FIG. 22, decompression engine 2200 includes arithmetic decoding unit 2202, dequantizer unit 2108, probability estimator unit 2110, and residual decoder unit 2204. Each of dequantizer unit 2108 and probability estimator unit 2110 may operate as described above. Further, arithmetic decoder unit 2202 may operate in a reciprocal manner to entropy encoding unit 2112.

Figure 23:
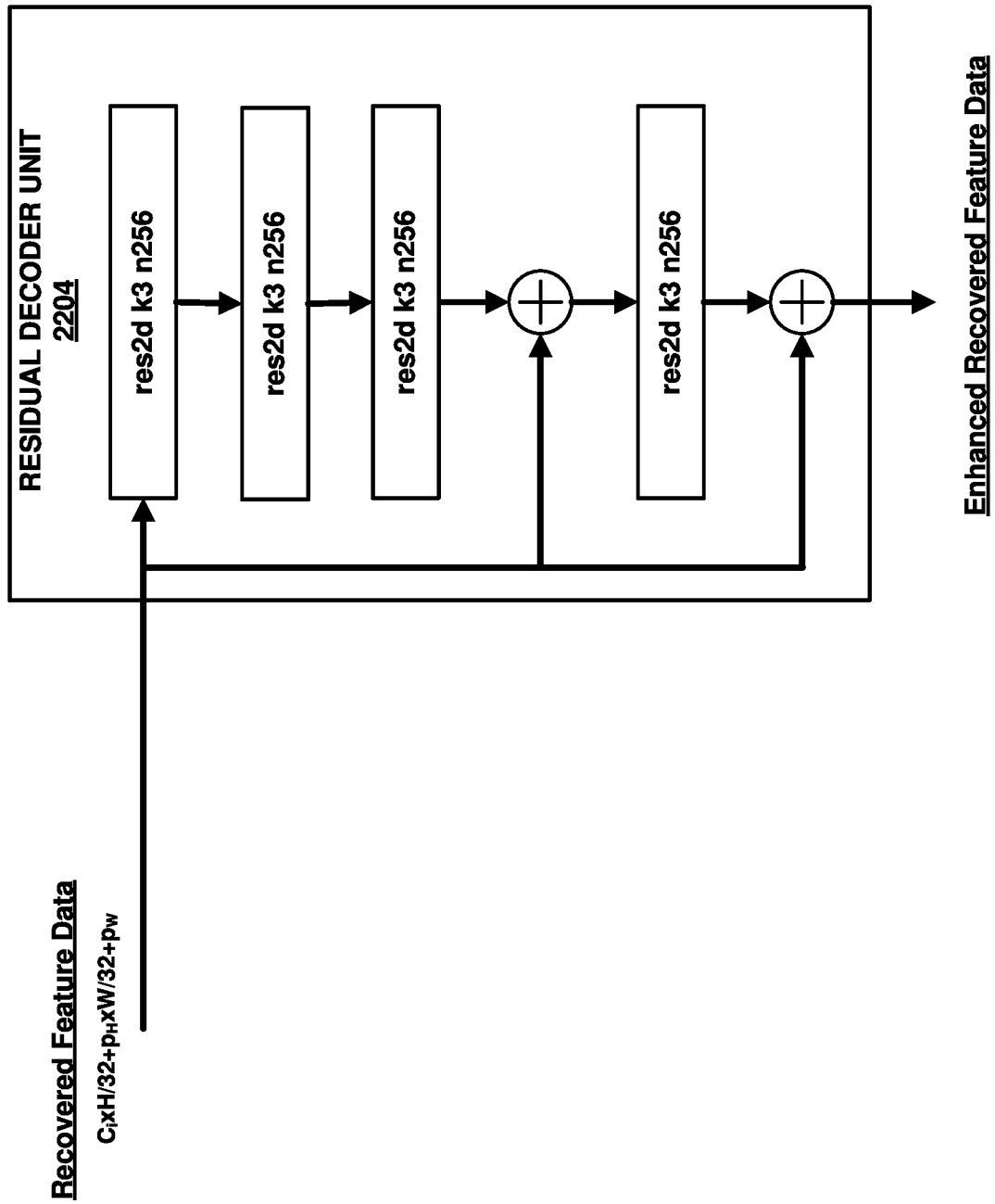
FIG. 23 is an example of a residual decoder unit in accordance with one or more techniques of this disclosure.

As described above, the conv2d k3 s3 p0 $nC_o$ operation in compression engine 2100 down samples the enhanced feature data about the spatial and channel dimension (i.e., to $C_o$). The conv2dT k3 s3 p0 nC operation in decompression engine 2200 is configured to perform a reciprocal operation such that the size and the number of channels are restored. As illustrated in FIG. 22, the output of the conv2dT k3 s3 p0 nC operation is input into residual decoder unit 2204. FIG. 23 illustrates an example of a residual decoder unit in accordance with one or more techniques of this disclosure. It should be noted that as illustrated in FIG. 22, the output of residual decoder unit 2204 is illustrated as being cropped. Such cropping is for purposes of performing a reciprocal operation to any padding performed by compression engine 2100. As illustrated in FIG. 23, a sequence of res2d k3 n256 operations and summations are performed resulting in a refinement value being added to the input. That is, the sequence of res2d k3 n256 operations and summations essentially operate to enhance edges and features. That is, the sequence of res2d k3 n256 operations and summations in residual encoder unit 2102 may sharpen the features/edges, for example for purposes of object tracking. Thus, according to the techniques herein, feature data may be compressed by using residual encoding to enhance feature data by removing redundancies, spatially down sampling and reducing the number of channels of the enhanced feature data by applying a 2D convolution operation, generating a heatmap based on the reduced enhanced feature data, scaling the reduced enhanced feature data using the generated heatmap, and entropy encoded the scaled reduced enhanced feature data to generate a bitstream.

As described above, reconstructed feature data may be input into an inference network unit. As such, the quality of the reconstructed feature data may be evaluated based on object detection performance with respect to a test image. That is, a rate-distortion tradeoff, may be optimized during training. In one example, according to the techniques herein, training may be carried out for a pre-determined number of epochs, and the model at the end of training may be used for evaluation. The number of epochs is a function of the training dataset. In one example, a batch size of one may be used for training experiments. Further, in one example, the learning rates for the probability estimator adapts at $\frac{1}{10}^{th}$ the learning rate of rest of the network. It should be noted that such an approach provides training stability.

It should be noted that, as with any learning-based approach, the selection of a loss function is critical for overall performance. In one example, a Lagrangian cost function (with parameter λ) may be used when performing rate-distortion tradeoffs. For distortion, a corresponding task loss function may be used. Loss may be computed for each input feature ($Feature_n$). Further, separate training may be carried out for each bitrate budget ($R_{budget,n}$) resulting in a separate model for each rate point.

In one example, object detection training loss for a Feature$_n$ is:

$$J_{detection,n} = \begin{cases} L_{detection,n} + \lambda(R_n - R_{budget,n}) & R_n > R_{budget,n} \\ L_{detection,n} & R_n < R_{budget,n} \end{cases}$$

where, $L_{detection,n}$ may corresponds to the multi-task loss specified in Ren et al., "Faster R-CNN: Towards Real-Time Object Detection with Region Proposal Networks," arXiv: 1506.01497v3, 6 Jan. 2016 for Faster RCNN.

Figure 24:
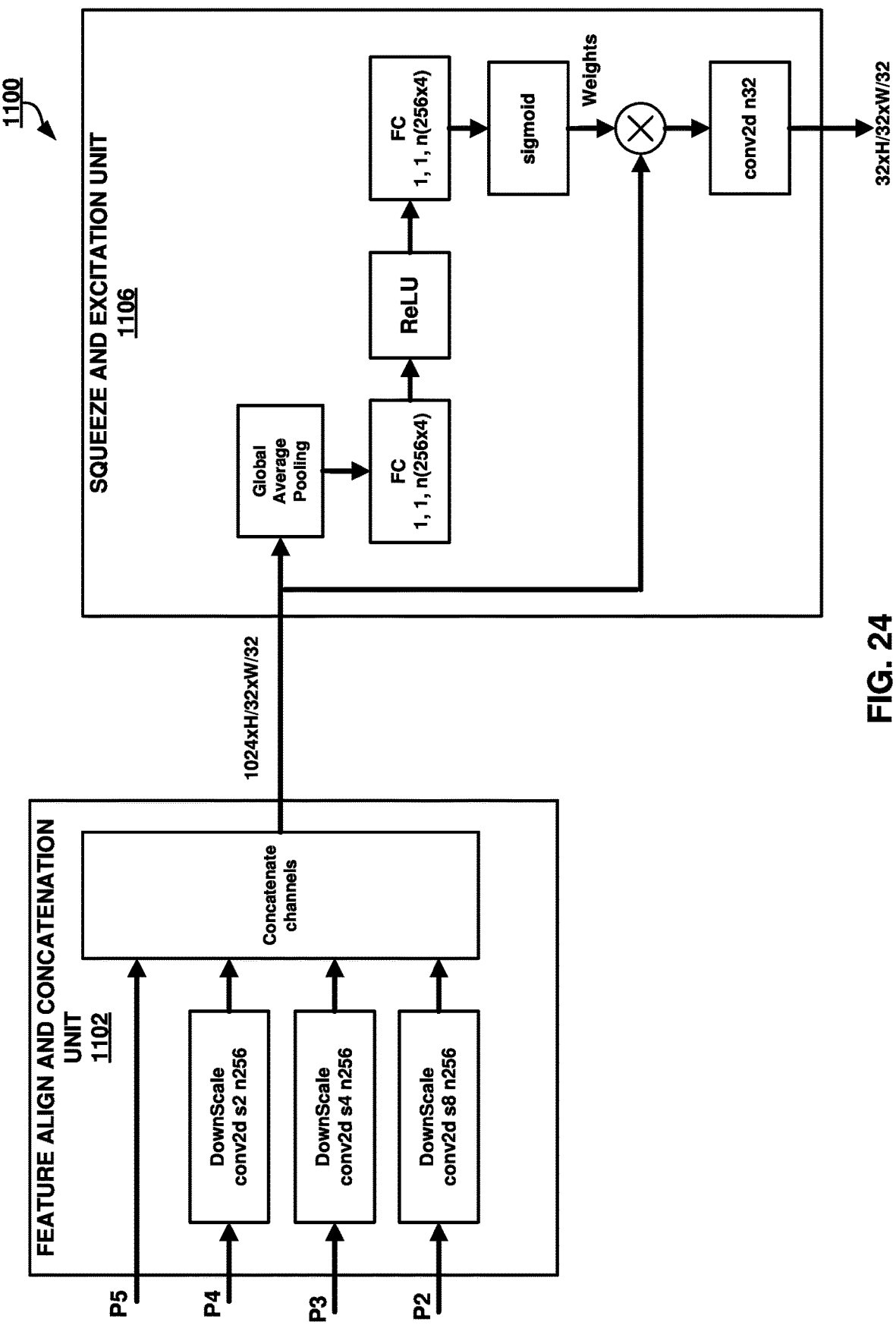
FIG. 24 is a block diagram illustrating an example components of a feature conversion engine that may code a multi-dimensional data set in accordance with one or more techniques of this disclosure.

As described above, for example, with respect to FIG. 13, in the example of Kim, for squeeze and excitation unit 1104, the number channels output is one of 256, 194, 144, or 64 and each FC stage includes 1024 parameters. As further described above, the input to the squeeze and excitation unit 1104 is feature data for P2, P3, P4, P5 concatenated about the channel dimension. Thus, each of the 1024 parameters correspond to a respective channel in each of P2, P3, P4, and P5. In one example, according to the techniques herein, a squeeze and excitation unit may output 32 channels and each FC stage may share a set of 256 parameters corresponding to each of the 256 channels in each of P2, P3, P4, and P5. That is, for each FC stage, a single set of 256 parameters may be used for each of the respective four sets of 256 channels forming the 1024 input channels. It should be noted that by sharing parameters, the total number of parameters is reduced. Further, the reweighing performance is improved due to P2, P3, P4, P5 including similar features in different spatial sizes. FIG. 24 illustrates an example of a squeeze and excitation unit 1106 included in a feature conversion engine 1100 according to the techniques herein. Further, as described above, for example with respect to FIG. 15, in the example of Kim, feature inverse conversion engine 1200 includes four distinct convolution operation performed on the input feature tensor and the upscaled feature tensors. In one example, according to the techniques herein, a shared 2D convolution operation with 256 channels output may be performed on each of the four tensors. Further, in one example, a shared 2D convolution transpose operation may be performed for the Upscale (2×) operation. Thus, according to the techniques herein, a feature fusion network and feature reconstruction network may be simplified by sharing parameters and by selecting an optimal number of channels for a feature map.

In this manner, compression engine 2100 represents an example of a device configured to receive feature data, perform residual encoding on the received feature data to generate enhanced feature data, apply a two-dimensional convolution operation on the enhanced feature data to generate reduced feature data, wherein the reduce feature data is reduced about spatial and channel dimensions, generate a heatmap based on the reduced feature data, scale the reduced feature data using the generated heatmap, and entropy encode the scaled reduced feature data to generate a bitstream.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of compressing feature data, the method comprising:
    receiving C×W/N×H/N feature data, wherein C is a number of channels, W is a width and H is a height of input data corresponding to the feature data, and N is a downsampling factor;
    performing residual encoding on the received feature data to generate enhanced feature data by adding refinement values to the received feature data;
    applying a two-dimensional convolution operation on the enhanced feature data to generate reduced feature data, wherein the received feature data is reduced about the spatial dimensions, W/N and H/N and the channel dimension, C;
    generating a heatmap based on the reduced feature data, wherein the heat map is an array of scaling factors to be applied at each spatial location;
    scaling the reduced feature data using the generated heatmap; and
    entropy encoding the scaled reduced feature data to generate a bitstream.

2. A device comprising one or more processors configured to:
    receive C×W/N×H/N feature data, wherein C is a number of channels, W is a width and H is a height of input data corresponding to the feature data, and N is a downsampling factor;
    perform residual encoding on the received feature data to generate enhanced feature data by adding refinement values to the received feature data;
    apply a two-dimensional convolution operation on the enhanced feature data to generate reduced feature data, wherein the received feature data is reduced about the spatial dimensions, W/N and H/N and the channel dimension, C;
    generate a heatmap based on the reduced feature data, wherein the heat map is an array of scaling factors to be applied at each spatial location;
    scale the reduced feature data using the generated heatmap; and
    entropy encode the scaled reduced feature data to generate a bitstream.

3. The device of claim 2, wherein received feature data corresponds to feature data generated according to Detectron2.

4. The device of claim 3, wherein received feature data includes multi-scale feature data generated according to Detectron2 concatenated about the channel dimension, C.

5. The device of claim 2, wherein scaling the reduced feature data using the generated heatmap includes scaling each channel, C, with a single generated heatmap.

* * * * *